US012266331B2

(12) United States Patent
Palmer

(10) Patent No.: US 12,266,331 B2
(45) Date of Patent: Apr. 1, 2025

(54) METHODS, SYSTEMS, APPARATUSES, AND DEVICES FOR FACILITATING THE INTERACTIVE CREATION OF LIVE MUSIC BY MULTIPLE USERS

(71) Applicant: Mark Lawrence Palmer, Nantucket, MA (US)

(72) Inventor: Mark Lawrence Palmer, Nantucket, MA (US)

( * ) Notice: Subject to any disclaimer, the term of this patent is extended or adjusted under 35 U.S.C. 154(b) by 613 days.

(21) Appl. No.: 17/567,341

(22) Filed: Jan. 3, 2022

(65) Prior Publication Data

US 2022/0215819 A1 Jul. 7, 2022

Related U.S. Application Data

(60) Provisional application No. 63/133,388, filed on Jan. 3, 2021.

(51) Int. Cl.
*G10H 1/00* (2006.01)
*G01P 13/00* (2006.01)
(Continued)

(52) U.S. Cl.
CPC .......... *G10H 1/0058* (2013.01); *G01P 13/00* (2013.01); *G01S 19/13* (2013.01); *G10H 1/0008* (2013.01);
(Continued)

(58) Field of Classification Search
CPC ............... G10H 1/0058; G10H 1/0008; G10H 2210/061; G10H 2210/105;
(Continued)

(56) References Cited

U.S. PATENT DOCUMENTS 8,269,093 B2 * 9/2012 Naik .................. G10H 1/40
84/612
8,300,668 B2 * 10/2012 Kim ................... H04J 3/0632
370/350

(Continued)

FOREIGN PATENT DOCUMENTS

EP             3886452 B1 *  6/2024  ............. G06Q 50/01
WO    WO-2019226681 A1 * 11/2019  ........... G10H 1/0008
WO    WO-2020006556 A9 *  3/2020  ........... G10H 1/0008

*Primary Examiner* — Christina M Schreiber
(74) *Attorney, Agent, or Firm* — Dhiraj Jindal; PATENT YOGI LLC

(57) ABSTRACT

Disclosed herein is a method for facilitating creating of music in real time by multiple users, in accordance with some embodiments. Accordingly, the method comprises receiving first music segment selections from a first user device, receiving second music segment selections from a second user device, transmitting the first music segment selections to the second user device, and transmitting the second music segment selections to the first user device. Further, each of the first user device and the second user device is configured for retrieving the first music segments, retrieving the second music segments, determining a universal time, synchronizing the second music segments with the first music segments to a common musical beat based on the universal time, mixing the second music segments with the first music segments based on the synchronizing, and generating a mixed music comprising the first music segments and the second music segments based on the mixing.

18 Claims, 28 Drawing Sheets

(51) Int. Cl.
*G01S 19/13* (2010.01)
*G06N 5/022* (2023.01)

(52) U.S. Cl.
CPC ....... *G06N 5/022* (2013.01); *G10H 2210/061* (2013.01); *G10H 2210/105* (2013.01); *G10H 2220/201* (2013.01); *G10H 2220/355* (2013.01); *G10H 2240/175* (2013.01); *G10H 2240/325* (2013.01); *G10H 2250/005* (2013.01)

(58) Field of Classification Search
CPC ....... G10H 2220/201; G10H 2220/355; G10H 2240/175; G10H 2240/325; G10H 2250/005; G01P 13/00; G01S 19/13; G06N 5/022
USPC .......................................................... 84/612
See application file for complete search history.

(56) References Cited

U.S. PATENT DOCUMENTS

| | | | |
|---|---|---|---|
| 8,487,173 B2* | 7/2013 | Emmerson | G10H 1/0025 84/602 |
| 10,218,747 B1* | 2/2019 | Monson | H04L 65/1093 |
| 11,120,782 B1* | 9/2021 | Vorobyev | G10H 1/0008 |
| 2004/0027369 A1* | 2/2004 | Kellock | G11B 27/034 |
| 2006/0123976 A1* | 6/2006 | Both | H04L 47/22 84/600 |
| 2008/0125889 A1* | 5/2008 | Atherton | G06F 16/437 700/94 |
| 2008/0190271 A1* | 8/2008 | Taub | G10H 1/0058 84/645 |
| 2009/0019374 A1* | 1/2009 | Logan | H04L 65/4061 715/753 |
| 2014/0230631 A1* | 8/2014 | Wieder | G10H 1/0033 84/609 |
| 2016/0057316 A1* | 2/2016 | Godfrey | G10L 21/013 704/207 |
| 2018/0233119 A1* | 8/2018 | Patti | G10H 1/0008 |
| 2019/0066643 A1* | 2/2019 | Packouz | G06F 3/165 |
| 2019/0355336 A1* | 11/2019 | Steinwedel | H04L 12/1813 |
| 2020/0150918 A1* | 5/2020 | Pachet | H04N 21/25891 |
| 2020/0234682 A1* | 7/2020 | Alston | G10H 1/366 |
| 2021/0055905 A1* | 2/2021 | Moldover | H04N 21/41407 |
| 2021/0201863 A1* | 7/2021 | Bosch Vicente | G10H 1/36 |
| 2021/0398511 A1* | 12/2021 | Patti | H04L 65/61 |
| 2022/0215819 A1* | 7/2022 | Palmer | G10H 1/0008 |
| 2024/0144977 A1* | 5/2024 | Mishra | G06F 16/435 |

* cited by examiner

METHODS, SYSTEMS, APPARATUSES, AND DEVICES FOR FACILITATING THE INTERACTIVE CREATION OF LIVE MUSIC BY MULTIPLE USERS

CROSS-REFERENCE TO RELATED APPLICATION

This application claims the benefit of U.S. Provisional Patent Application No. 63/133,388, titled "Jamables—A system for creating social and spatial music using mobile devices", filed on Jan. 3, 2021, which is incorporated by reference herein in its entirety.

FIELD OF THE INVENTION

Generally, the present disclosure relates to the field of data processing. More specifically, the present disclosure relates to methods, systems, apparatuses, and devices for facilitating the interactive creation of live music by multiple users.

BACKGROUND OF THE INVENTION

The field of data processing is technologically important to several industries, business organizations, and/or individuals. In particular, the use of data processing is prevalent for facilitating creating of music by multiple users.

Making music is a popular hobby, and is very effective for bringing people together. In the past, to create music, a person needed to have instruments or electronic devices to synthesize or reproduce instruments, skill to play them, and technology to amplify or mix each output together for output by stereo system. In recent years, with the proliferation of smartphones, tablets, and online music production technology, it has become viable for anyone to explore making music.

It is nonetheless difficult and inconvenient to create music as a group. There are a number of apps available that allow an individual familiar with modern digital music production tools to create music with less musical ability than was traditionally required. Making music is often more satisfying, rewarding, and fulfilling when done spontaneously, as at a social gathering. For this reason, musicians will often form bands, rather than play solo. However, current tools do not support creating music by non-musicians as a spontaneous recreational activity among anonymous participants, as in a social gathering or 'open jam'.

Existing techniques for facilitating the interactive creation of live music by multiple users are deficient with regard to several aspects. For instance, current technologies do not automate and assist the process of creating music spontaneously, by non-skilled persons. Further, current technologies do not facilitate finding other players and arranging to convene, online or in real life. Furthermore, current technologies do not facilitate agreeing on what kind of music to play. Furthermore, current technologies further do not facilitate synchronizing different instrumental outputs to a common beat during live performance. Moreover, current technologies do not provide a way to capture and reproduce the spatial placement of instruments when the result is mixed into one output in real time. Furthermore, current technologies do not provide a way to further specify a spatial location, orientation, and motion of music as a part of its composition.

Therefore, there is a need for improved methods, systems, apparatuses, and devices for facilitating the interactive creation of live music by multiple users that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating creating of music in real time by multiple users, in accordance with some embodiments. Accordingly, the method may include a step of receiving, using a communication device, one or more first music segment selections from a first user device associated with a first user. Further, the one or more first music segment selections identifies one or more first music segments. Further, the method may include a step of receiving, using the communication device, one or more second music segment selections from a second user device associated with a second user. Further, the one or more second music segment selections identifies one or more second music segments. Further, the one or more first music segments may be musically compatible with the one or more second music segments. Further, the method may include a step of transmitting, using the communication device, the one or more first music segment selections to the second user device. Further, the method may include a step of transmitting, using the communication device, the one or more second music segment selections to the first user device. Further, each of the first user device and the second user device may be configured for retrieving, using a client-side storage device, the one or more first music segments. Further, each of the first user device and the second user device may be configured for retrieving, using the client-side storage device, the one or more second music segments. Further, each of the first user device and the second user device may be configured for determining, using a GPS receiver, a universal time. Further, each of the first user device and the second user device may be configured for synchronizing, using a client-side processing device, the one or more second music segments with the one or more first music segments to a common musical beat based on the universal time. Further, each of the first user device and the second user device may be configured for mixing, using the client-side processing device, the one or more second music segments with the one or more first music segments based on the synchronizing. Further, each of the first user device and the second user device may be configured for generating, using a sound reproduction device, a mixed music may include the one or more first music segments and the one or more second music segments based on the mixing.

Further, disclosed herein is a system for facilitating creating of music in real time by multiple users, in accordance with some embodiments. Accordingly, the system may include a communication device. Further, the communication device may be configured for receiving one or more first music segment selections from a first user device associated with a first user. Further, the one or more first music segment selections identifies one or more first music segments. Further, the communication device may be configured for receiving one or more second music segment selections from a second user device associated with a second user. Further, the one or more second music segment selections identifies one or more second music segments. Further, the one or more first music segments may be musically compatible with the one or more second music segments. Further, the communication device may be configured for transmitting the one or more first music segment selections to the second user device. Further, the communication device may be configured for transmitting the one or more second music segment selections to the first user device. Further, each of the first user device and the second user device may include a client-side storage device, a GPS receiver, a client-side processing device, and a sound reproduction device. Further, the client-side storage device of each of the first user device and the second user device may be configured for retrieving the one or more first music segments. Further, the client-side storage device of each of the first user device and the second user device may be configured for retrieving the one or more second music segments. Further, the GPS receiver of each of the first user device and the second user device may be configured for determining a universal time. Further, the client-side processing device of each of the first user device and the second user device may be configured for synchronizing the one or more second music segments with the one or more first music segments to a common musical beat based on the universal time. Further, the client-side processing device of each of the first user device and the second user device may be configured for mixing the one or more second music segments with the one or more first music segments based on the synchronizing. Further, the sound reproduction device of each of the first user device and the second user device may be configured for generating a mixed music may include the one or more first music segments and the one or more second music segments based on the mixing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
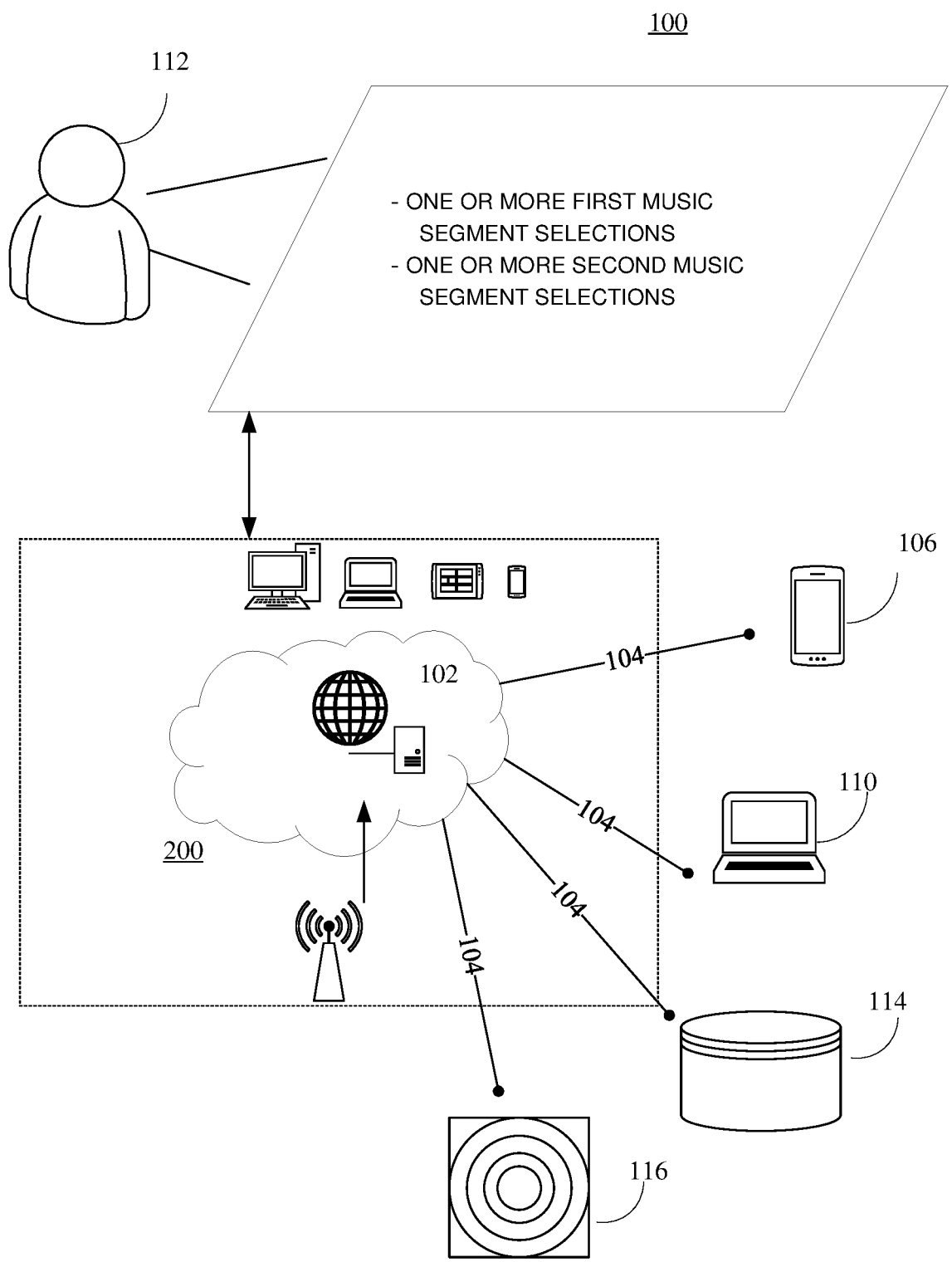
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating the interactive creation of live music by multiple users, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user, and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), and a biometric sensor (e.g. a fingerprint sensor).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating the creation of live music by multiple users. Further, Jamables, an exemplary embodiment of the system, may allow users to join with friends or nearby available participants to mix (create) music, without needing musical knowledge or any special networking setup. Further, Jamables, an exemplary embodiment of the system, lets its users join with friends or nearby (within audible proximity) arbitrary participants to create music, without needing instruments, musical knowledge, or any special hardware or networking setup. Further, the Jamables may run on common mobile and computing devices using modern cell or Wi-Fi networking. Further, the disclosed system may synchronize music across multiple devices/users to a common musical beat.

Further, Jamables, an exemplary embodiment of the system, synchronizes different musical segments, each playing on its own device, to their common tempo in real time. Each user may control one instrument or sound source by selecting a musical segment from a quiver containing a subset of compatible musical segments. Using a quiver to hold a compatible set of sounds supports matching between the musical contributions of the other players. Further, the disclosed system may be associated with different libraries available for the users to access, each with a collection of sounds/music (segments) that are suitable for playing together. These segments may often be pre-recorded, repeating loops, but might also be recorded live. Further, "library" to refer to a universe of many possible tempos, keys, and genres, possibly incompatible. The library consists of subsets ("stacks" or "packs") that group compatible segments into themes (genres, instruments, etc). Users then choose packs from the library to place on the quiver for use while jamming. The function of the quiver is hold packs that are musically compatible (by tempo and key) with what other users have on their quivers, for quick access. Without this quiver function, users face a daunting task of searching through impossibly large amounts of incompatible music to find something to preview and add to the jam.

Further, Jamables may be configured for identifying other possible participants by audible proximity, geographic search, social network, search rules, or shared URL link. Further, the Jamables may be configured for facilitating allowing each participant to join or leave the live mixing session (jam) at will. Further, the Jamables may be configured for facilitating presenting each user with a selection of potentially compatible musical segments by using matching rules involving, for example, key, tempo, genre, instrument, etc. Further, the Jamables may be configured Offering hints to guide users regarding what kinds of segments might be best to add to the current mix, warnings about potentially bad combinations, and guidance about how long to play a particular segment. Further, the Jamables may be configured for facilitating synchronizing devices so each user can play its selection in tempo with the others across independent devices sharing a synchronized clock (e.g. GNSS/GPS) or network connection. Further, the Jamables may be configured for facilitating applying rules to determine which musical sources are included in the live jam, from moment to moment. For example, the rules might limit the maximum number of participants, or favor participants by proximity, instrument, or other criteria. Further, the Jamables may be configured for facilitating optionally mixing all contributing musical selections so that any phone can play them all, perhaps amplifying the result, or for headphone listening. Further, the Jamables may be configured for facilitating representing and reproducing the spatial context of the music source in the mixed signal so that direction and distance information is available in the resulting mix. Further, the Jamables may be configured for facilitating providing a notation for assigning music spatial characteristics during composition. Further, the Jamables may be configured for facilitating capturing and representing the spatial context of the music for spatialized reproduction. Further, the Jamables may be configured for enabling automatic operation, whereby an algorithm selects the segment to play in response to a set of rules and inputs. Further, the Jamables may be configured for enabling music to be discovered and shared geographically, or socially by sharing it during the jam. Further, the Jamables may be configured for providing functions that assign musical segments to geographic locations and movement in space systematically, to effect large-scale "musical landscaping".

Further, the disclosed system may include a player component. Further, the player component is what users see and interact with. Further, the player component may synchronize audible output from the users' device with that from other devices. Further, the player component may show the user a quiver of available music segments, beats, or loops. Further, the player component may allow the user to select beat(s) to play, Join or Leave the ongoing jam, send or display messages to other players, providing feedback regarding each selection that could be used, for example, to control relative volumes in the mix. Further, the player component may facilitate synchronizing segments playing from each user's device with dissimilar outputs on other devices, based on common tempo, time signature, etc. (via UMS quantization) Further, the player component may facilitate selecting options for varying player functionality such as search range and automated (jambot) operation. Further, disclosed system may include a mixer component that optionally takes an input set of beats and automatically aligns them to match beat offsets, making adjustments as needed to tempo, pitch, etc. so that the resulting output is synchronized on a beat and compatible in a musical key. Further, the disclosed system may include a matcher component that uses rules or pattern-matching type AI to suggest beats that may be most compatible with the other beats currently playing in a Jam or to warn about musically inappropriate combinations. Further, the users may solicit and accept a suggestion of the matcher component, or choose another beat from those available. Further, the disclosed system may include a synchronizer that reads a shared time source, calculates the latency of the connection and audio output path, and schedules musical segments to align beats in real time based on their common rhythm (tempo, time signature, or other extracted features) with different segments being played on other devices. The various segments may be started at arbitrary times. Further, the Jamables may use the mobile devices' GPS timestamp as well as network time sources. Further, the disclosed system may include a music radar that tracks client GPS location and reports it to a server, lists other jam participants as they join or leave the jam, and displays more details about participants on request (for example, link to social media profile), registers and detects an optional "searching" signal to notify users of the proximity of other potential players, or about someone wanting to join a private jam, applies search heuristics to select the players best suited musically to participate in a jam, presents feedback from players regarding the current segments in the mix, potentially used to control relative volume in the mix. E.g., negative feedback on one segment could reduce the volume of that segment in the mix proportionately, and presents an option to "Grab" a set of segments the first user encounters when hearing the at least one additional user play one segment from a set during a jam, to immediately add all segments from the same set to the first user's quiver. Further, the criteria used in search rules may include but are not limited to, spatial/geographic specifications. Further, the spatial specifications may be associated with nearest N users within an optional distance range or locality. Further, the spatial specifications may be associated with users selected by instrument type, musical genre, experience level. Further, the spatial specifications may be associated with users selected for inclusion by social networks. Further, the inclusion by social networks may include friends, friends-of-friends, group membership, etc. Further, the spatial specifications may be associated with group membership. Further, the spatial specifications may be associated with interest indicators, e.g. "interested in classical music". The search function may also implement rules for constructing a better combination of music or limiting the size of a Jam. Example search rules may find music compatible with a certain Key and Tempo and instruments limited by eliminating duplicate instrument types. Further, the search rules may facilitate prioritizing beats that have been most recently initiated over older ones. Further, the search rules may automatically be expiring/excluding segments that have been playing in the mix for too long.

Further, the disclosed system may include a music database (or database component). Further, the Jamables players may share a common set of sound recordings which are encoded with metadata: spatial position, motion, instrument, genre, key, tempo, and other information which allows the Radar and Matcher to assist users in finding compatible music to mix during a jam. The database component stores the collection of musical segments available for the players to select, tracks the locations of users, tracks which Players are available, and which are participating in jams. Further, the musical segments available for the players are organized into 'mixes', or sets of segments, by genre, instrument type, or other themes. The database may contain segments with many musical features (e.g. tempo, key) but guides users to those sets which would be compatible with the current jam, to place on the Quiver. Further, the Quiver holds a small subset of the music library available for quick access. This subset represents segments of interest for current and anticipated jams, having musical features (tempo, Key, etc.) that are musically compatible with segments currently being played by other users in the jam. Further, the disclosed system may be associated with JamBot. Further, the Jam bot (or bot) is an automated Player, or agent, which simulates a user of the jamables Player. The bot may be programmed with a set of rules which govern its position and its output. For example, the virtual music source created by the JamBot may be positioned along a path and set to play different kinds of sound or music depending on the time of day. Further, the JamBots may be programmed to move around and to play certain selections in response to the beats they "hear" around them. Further, the Jambots may also respond to various messages sent from other players via the system, asking them to stop playing, play something else, etc. Further, the Jambots may appear to a listener virtually, or be implemented using physical devices like smartphones, robots, drones, etc. Further, a user may switch his smartphone or other devices to serve as a jambot, putting it under control of the algorithm or external input. Further, the disclosed system may include a recorder & spatial encoder. Further, a Jamables spatial music notation associated with the system defines a way to specify the location and motion of each sound source. Music segment Origins can be, for example: relative to the jambot current position and relative to the listener. Locations may be relative to the listener, relative to the listener's initial position, relative to other players, or using static geographic coordinates. Musical notes may be assigned spatial positions based on frequency, tempo, instrument, or other musical characteristics.

Each microphone records GPS position coordinates along with incoming sound, or in the case of synthesized, spatialized instruments assign the spatial coordinates of each note as it is played.

Further, the recorder allows participants to capture music along with its detailed spatialization information, metadata about a key, tempo, genre, etc, and add the music to the shared library. Further, the music may be annotated spatially during composition and then represented in formats like MIDI, to designate its location. Further, the disclosed system may be associated with a musical landscaping tool. Further, the Jamables allow music to be arranged and presented spatially in close-range or broad-range geographic contexts. For instance, a fiddler could be assigned to fly in circles above the roof, notes of a pipe organ could be assigned to positions varying by height, an entire symphonic composition could be annotated to distribute the orchestra around an area like a grocery, town, or street, the string section could be assigned to be playing in the Produce aisle, with woodwinds in dairy, etc., an entire region could be JamBot swarm to implement a certain genre, etc.

Further, the present disclosure describes Jambot Control. Further, the Jambot control provides a graphical interface and API that allows jambots to be "planted", deleted, and programmed. Functions include: Pick a location, List jambots nearby, Select jambot, Delete, Set Loop/segment to play, Set Rules for which segment to play (example choices: Fixed, Random from mix set, By schedule, and By what other segments are nearby or playing in the jam mix), Set locale origin (such as: At Absolute geographic location, Relative to listener's current location, and Relative to listener's initial location on session start), and Set motion options (such as Stationary, Circling, Random movement, and Along a path).

Further, the disclosed system may be used for combining sound effects, voices, animal sound, sequences, or any other variations known in the art. Further, the disclosed system may be accessed and played through a smartphone, tablet, desktop computer, laptop, or any other variations known in the art. Further, the disclosed system may be configured for facilitating creating music spontaneously in real-time by non-musician participants. Further, the disclosed system may be configured for facilitating joining strangers as participants based on geography or social network. Further, the disclosed system may be configured for facilitating guiding the non-musicians in choosing compatible musical parts and providing real-time feedback to the group regarding the mix. Further, the disclosed system may be configured for facilitating the synchronization of beats among commercial smartphones using low-quality chips. Further, the disclosed system may be configured for facilitating composing and reproducing of a geo spatial structure of music. Further, the disclosed system may be configured for facilitating supporting spontaneous, social interactive creation of live music by non-musicians in rea-time using synchronized smartphones. Further, the disclosed system may be configured for making a line of musical action figure dolls using a tempo-to-time mapping algorithm.

Further, the disclosed system Jamables is a method for Composing and Performing Social, Spatial Music.

Further, the present disclosure describes a method for facilitating the interactive creation of live music by multiple users, in accordance with some embodiments. The method may include a step of receiving, using a communication device, one or more first music segments from one or more first user devices associated with one or more first users. Further, the method may include a step of analyzing, using a processing device, the one or more first music segments. Further, the method may include a step of receiving, using the communication device, one or more second music segments from one or more second user devices associated with one or more second users. Further, the method may include a step of analyzing, using the processing device, the one or more second music segments using one or more feature extraction algorithms. Further, the first feature extraction algorithm may be configured for identifying a common musical tempo, key, or other musical characteristics in the one or more second music segments in relation to the one or more first music segments. Further, the method may receive actions from the first user causing a selected audio segment to begin playing on the first user's device, and a subsequent action causing the selected segment to stop playing. Further, the method may include a step of analyzing, using the processing device, the one or more second music segments using one or more machine learning algorithms. Further, the first machine learning algorithms may be configured for identifying musically pleasing combinations among the one or more second music segments in relation to the one or more first music segments. Further, the method may include a step of synchronizing, using the multiple processing devices accessing a common clock source, the one or more second music segments with the one or more first music segments based on their common musical rhythm. Further, the method may include a step of mixing, using the processing device, the one or more second music segments with the one or more first music segments based on the synchronizing. Further, the method may include a step of generating, using the processing device, a mixed music of the one or more first music segments and the one or more second music segments based on the device location, extracted musical features. Further, the method may include a step of transmitting, using the communication device, data allowing each device to create a localized mix of the common segment selections on the one or more first user devices, synchronized with the one or more second user devices.

Further, the present disclosure describes a system for facilitating interactive creation of live music by multiple users, in accordance with some embodiments. The system may include a communication device, a processing device, and a storage device, and a common synchronized clock. Further, the communication device may be configured for performing a step of mixing the current selections of musical segments from the perspective of the first user. Further, the processing device may be configured to allow the first user to privately preview the result of adding a selected musical segment to the common live mix, then send a signal to the second or more users to join the selected musical segment to the common live mix, and to unjoin the selected segment from the live mix. Further, the processing device may be communicatively coupled with the communication device. Further, the processing device may be configured for performing a step of analyzing the one or more first music segments. Further, the processing device may be configured for performing a step of synchronizing the one or more second music segments, across devices with the one or more first music segments based on the one or more common musical beats. Further, the processing device may be configured for performing a step of generating the mixed music of the one or more first music segments and the one or more second music segments based on the perspective of the first user.

FIG. 1 is an illustration of an online platform 100 consistent with various embodiments of the present disclosure. By way of non-limiting example, the online platform 100 for facilitating the interactive creation of live music by multiple users may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110

(such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
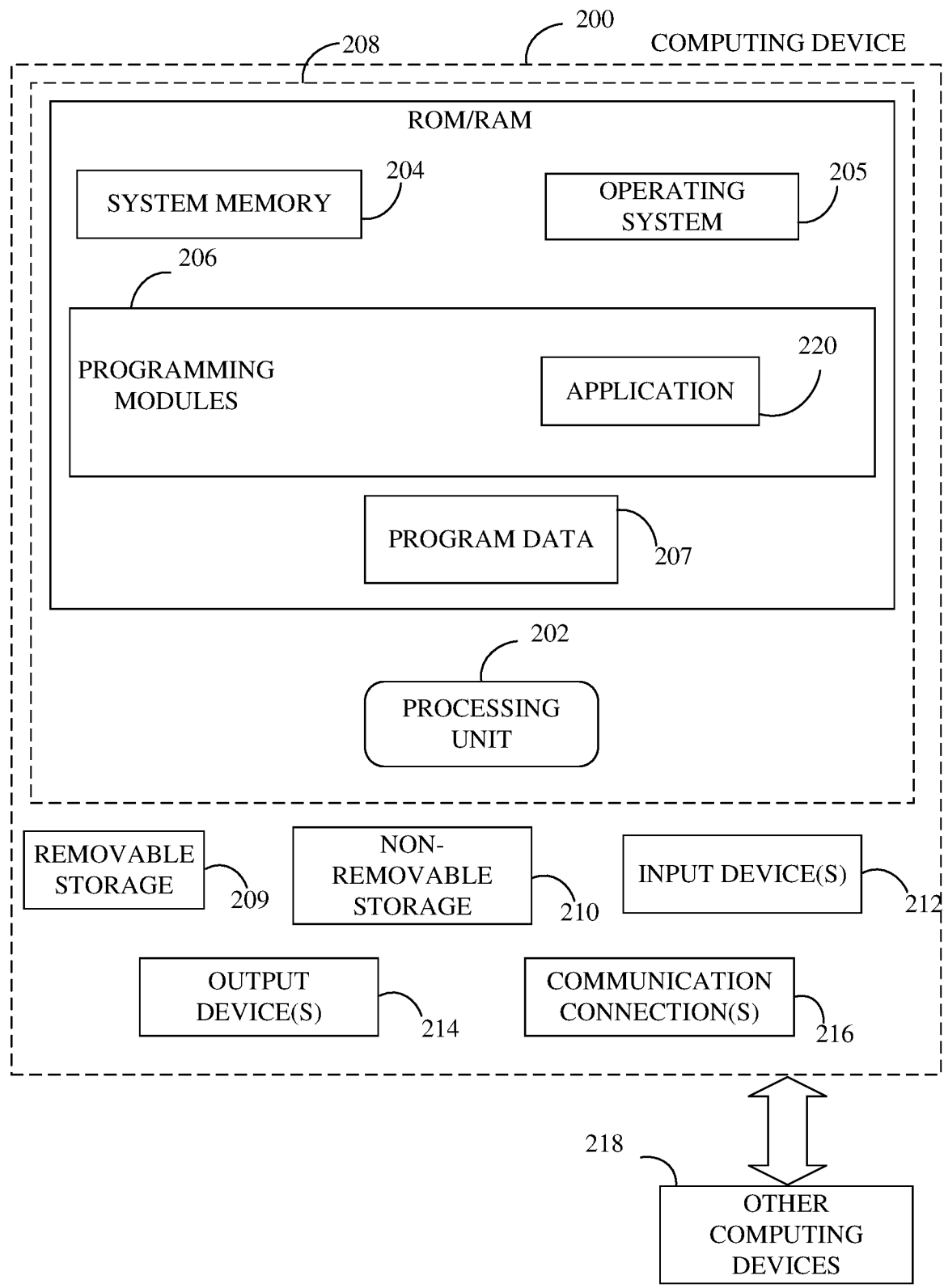
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
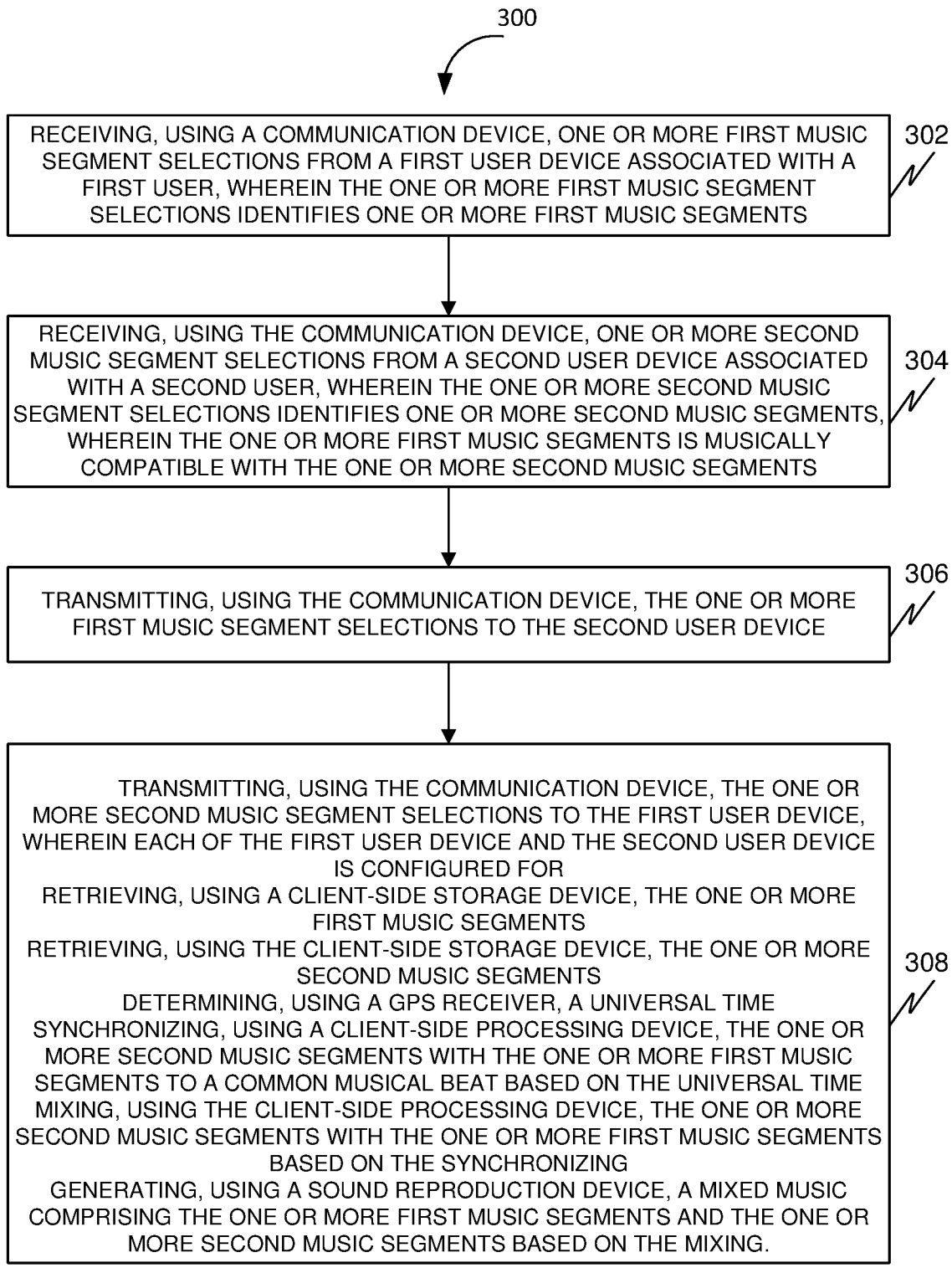
FIG. 3 is a flow chart of a method for facilitating creating of music in real time by multiple users, in accordance with some embodiments.

FIG. 3 is a flow chart of a method 300 for facilitating creating of music in real time by multiple users, in accordance with some embodiments. Accordingly, at 302, the method 300 may include receiving, using a communication device, one or more first music segment selections from a first user device associated with a first user. Further, the one or more first music segment selections identifies one or more first music segments. Further, the first user device may include a computing device, a music playback device, a speaker, etc. Further, the one or more first music segments may include pre-recorded music segments, repeating loops of music, live recorded music segments, etc. Further, at 304, the method 300 may include receiving, using the communication device, one or more second music segment selections from a second user device associated with a second user. Further, the second user device may include a computing device, a music playback device, a speaker, etc. Further, the one or more second music segment selections identifies one or more second music segments. Further, the one or more first music segments may be musically compatible with the one or more second music segments. Further, the one or more second music segments may include pre-recorded music segments, repeating loops of music, live recorded music segments, etc. Further, at 306, the method 300 may include transmitting, using the communication device, the one or more first music segment selections to the second user device. Further, at 308, the method 300 may include transmitting, using the communication device, the one or more second music segment selections to the first user device. Further, each of the first user device and the second user device may be configured for retrieving, using a client-side storage device, the one or more first music segments. Further, each of the first user device and the second user device may be configured for retrieving, using the client-side storage device, the one or more second music segments. Further, each of the first user device and the second user device may be configured for determining, using a GPS receiver, a universal time. Further, each of the first user device and the second user device may be configured for synchronizing, using a client-side processing device, the one or more second music segments with the one or more first music segments to a common musical beat based on the universal time. Further, each of the first user device and the second user device may be configured for mixing, using the client-side processing device, the one or more second music segments with the one or more first music segments based on the synchronizing. Further, each of the first user device and the second user device may be configured for generating, using a sound reproduction device, a mixed music may include the one or more first music segments and the one or more second music segments based on the mixing.

In further embodiments, the method 300 may include transmitting, using the communication device, each of the one or more first music segments and the one or more second music segments to each of the first user device and the second user device.

Further, in some embodiments, the one or more first music segments may be associated with one or more first spatial locations. Further, the one or more second music segments are associated with one or more second spatial locations. Further, the sound reproduction device in each of the first user device and the second user device may be configured for reproducing the mixed music based on the one or more first spatial locations and the one or more second spatial locations.

Further, in an embodiment, each of the first user device and the second user device may include a motion sensor configured to sense a movement. Further, the movement may be associated with one or more of the first user and the second user. Further, the sound reproduction device may be configured for reproducing the mixed music based on the movement. Further, in some embodiments, the motion sensor may include a location sensor. Further, the location sensor may be configured for detecting a location of one or more of the first user and the second user. Further, the sound reproduction device may be configured for reproducing the mixed music based on the location.

Further, in some embodiments, the first user device may be configured for receiving, using an input device, a preview mode selection. Further, the mixed music generated by the first user device may be based on receiving the preview mode. Further, the first user device may be configured for receiving, using the input device, a join mode selection. Further, the method 300 may include receiving, using the communication device, the join mode selection from the first user device. Further, the transmitting of the first one or more music segments to the second user device may be based on the receiving of the join mode selection.

Figure 4:
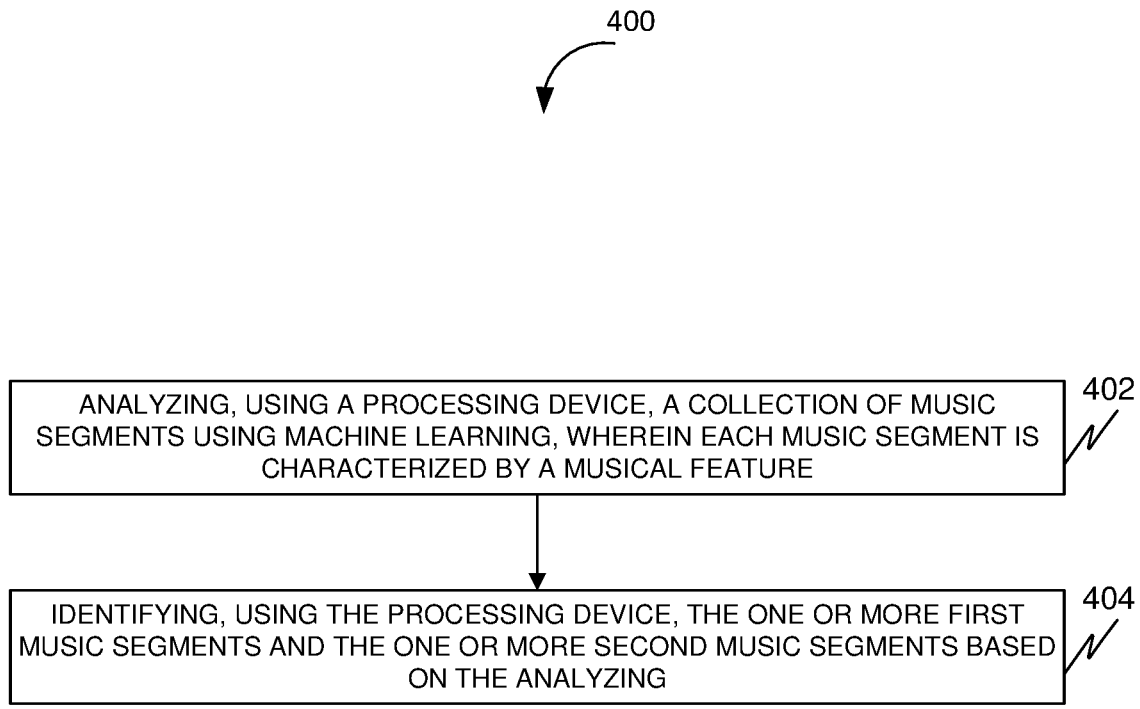
FIG. 4 is a flowchart of a method for identifying the one or more first music for facilitating the creating of the music in real time by the multiple users, in accordance with some embodiments.

FIG. 4 is a flowchart of a method 400 for identifying the one or more first music for facilitating the creating of the music in real time by the multiple users, in accordance with some embodiments. Accordingly, at 402, the method 400 may include analyzing, using a processing device, a collection of music segments using machine learning. Further, each music segment may be characterized by a musical feature. Further, the musical feature may include music genre, key, tempo, count, etc.

Further, at 404, the method 400 may include identifying, using the processing device, the one or more first music segments and the one or more second music segments based on the analyzing.

In further embodiments, the method 400 may include extracting, using the processing device, each of the musical feature for each music segment using a feature detection algorithm based on machine learning.

Figure 5:
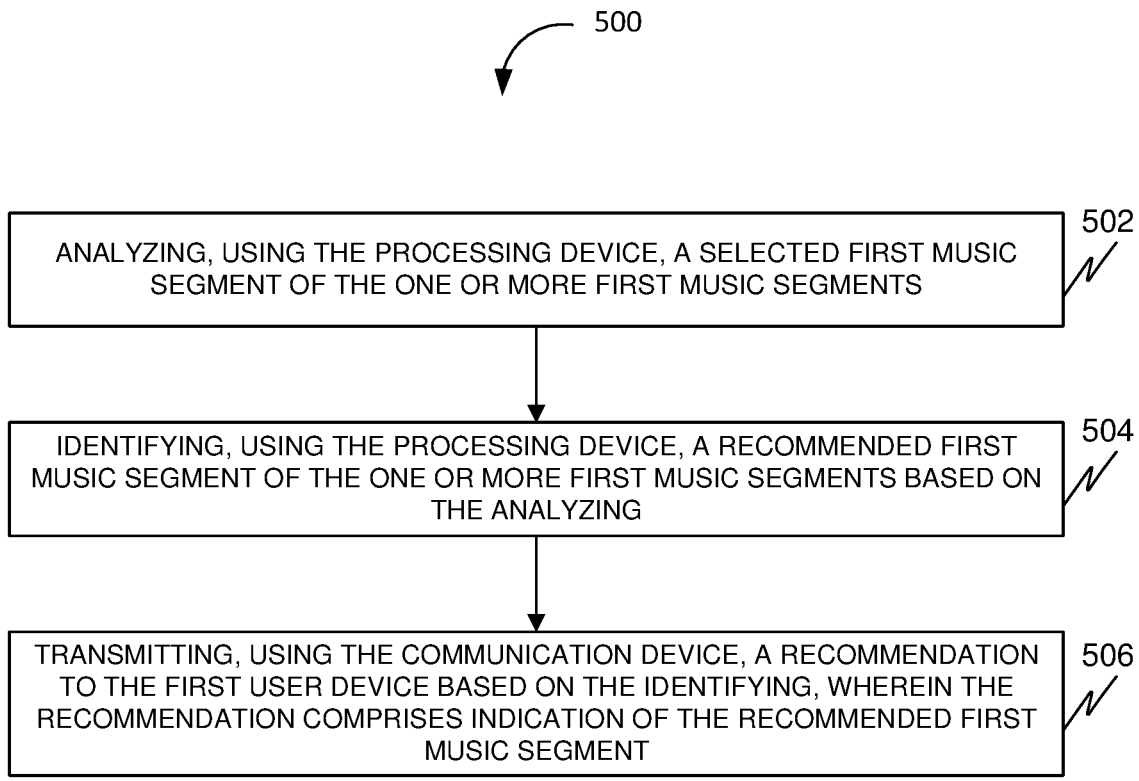
FIG. 5 is a flowchart of a method for identifying a recommended first music segment for facilitating the creating of the music in real time by the multiple users, in accordance with some embodiments.

FIG. 5 is a flowchart of a method 500 for identifying a recommended first music segment for facilitating the creating of the music in real time by the multiple users, in accordance with some embodiments. Accordingly, at 502, the method 500 may include analyzing, using a processing device, a selected first music segment of the one or more first music segments.

Further, at 504, the method 500 may include identifying, using the processing device, a recommended first music segment of the one or more first music segments based on the analyzing.

Further, at 506, the method 500 may include transmitting, using the communication device, a recommendation to the first user device based on the identifying. Further, the recommendation may include indication of the recommended first music segment.

In further embodiments, the method 500 may include analyzing, using the processing device, the one or more second music segments. Further, the identifying of the recommended first music segment may be further based on the analyzing of the one or more second music segments.

Figure 6:
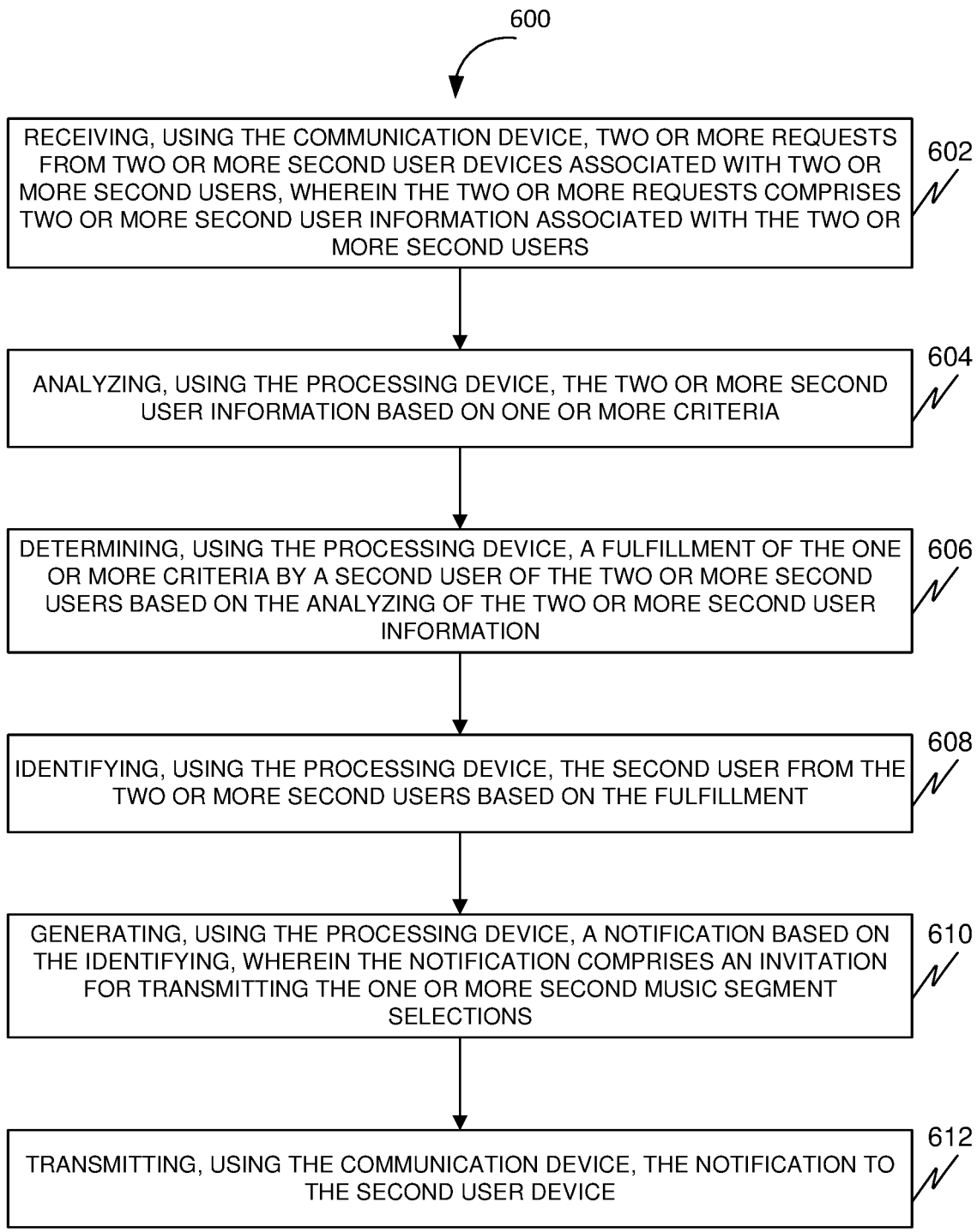
FIG. 6 is a flowchart of a method for identifying a second user from the two or more second users for facilitating the creating of the music in real time by the multiple users, in accordance with some embodiments.

FIG. 6 is a flowchart of a method 600 for identifying a second user from the two or more second users for facilitating the creating of the music in real time by the multiple users, in accordance with some embodiments. Accordingly, at 602, the method 600 may include receiving, using the communication device, two or more requests from two or more second user devices associated with two or more second users. Further, the two or more requests may include two or more second user information associated with the two or more second users. Further, the two or more second user devices may include computing devices, music playback devices, speakers, etc. Further, the two or more requests may include two or more second user information associated with the two or more second users. Further, the two or more second user information may include geographical information, musical interest information, social information, musical qualification information, etc. of the two or more second users.

Further, at 604, the method 600 may include analyzing, using the processing device, the two or more second user information based on one or more criteria. Further, the one or more criteria may be based on one or more specifications. Further, the one or more specifications may include a spatial/geographic specification, a proximity specification, a musical specification, a social community specification, an interest specification, etc. Further, the proximity specification may include nearest N users within an optional distance range or locality. Further, the musical specification may include an instrument type, a musical genre, an experience level, etc. Further, the social community specification may include friends, friends-of-friends, etc. Further, the interest specification may include interest indicators, e.g. "interested in classical music".

Further, at 606, the method 600 may include determining, using the processing device, a fulfillment of the one or more criteria by a second user of the two or more second users based on the analyzing of the two or more second user information.

Further, at 608, the method 600 may include identifying, using the processing device, the second user from the two or more second users based on the fulfillment.

Further, at 610, the method 600 may include generating, using the processing device, a notification based on the identifying. Further, the notification may include an invitation for transmitting the one or more second music segment selections.

Further, at 612, the method 600 may include transmitting, using the communication device, the notification to the second user device.

Figure 7:
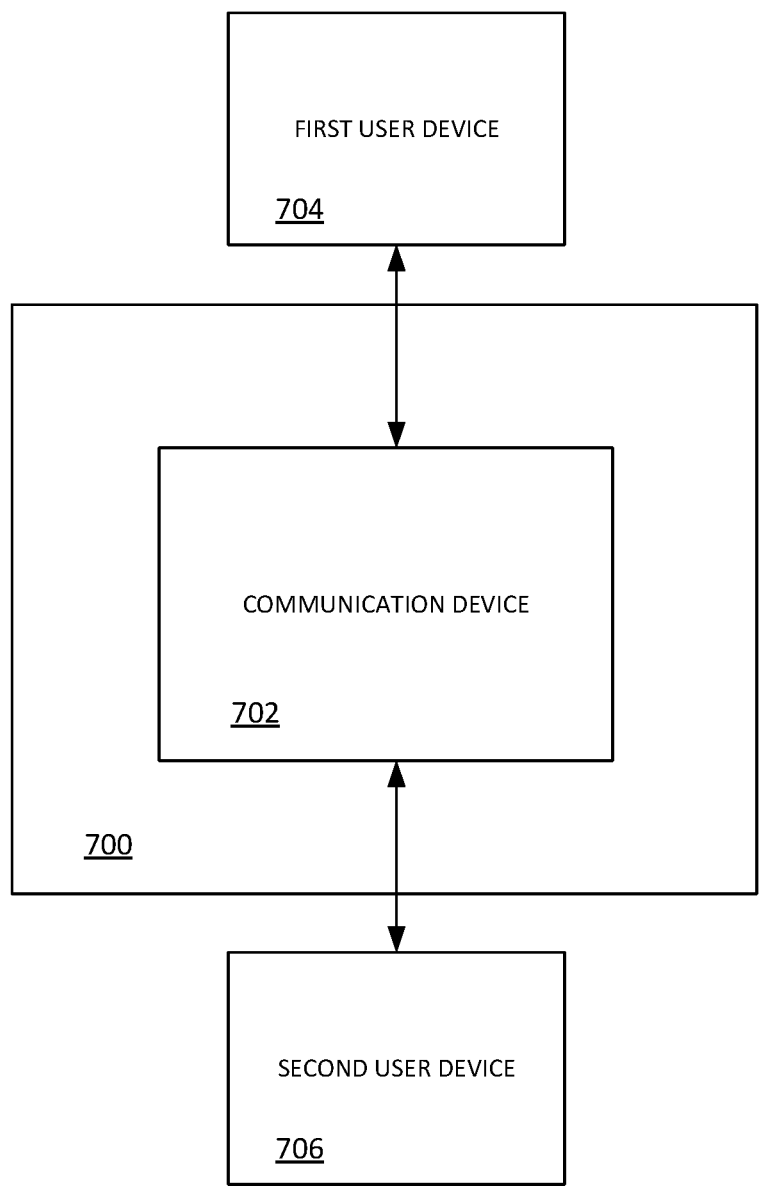
FIG. 7 is a block diagram of a system for facilitating creating of music in real time by multiple users, in accordance with some embodiments.
Figure 8:
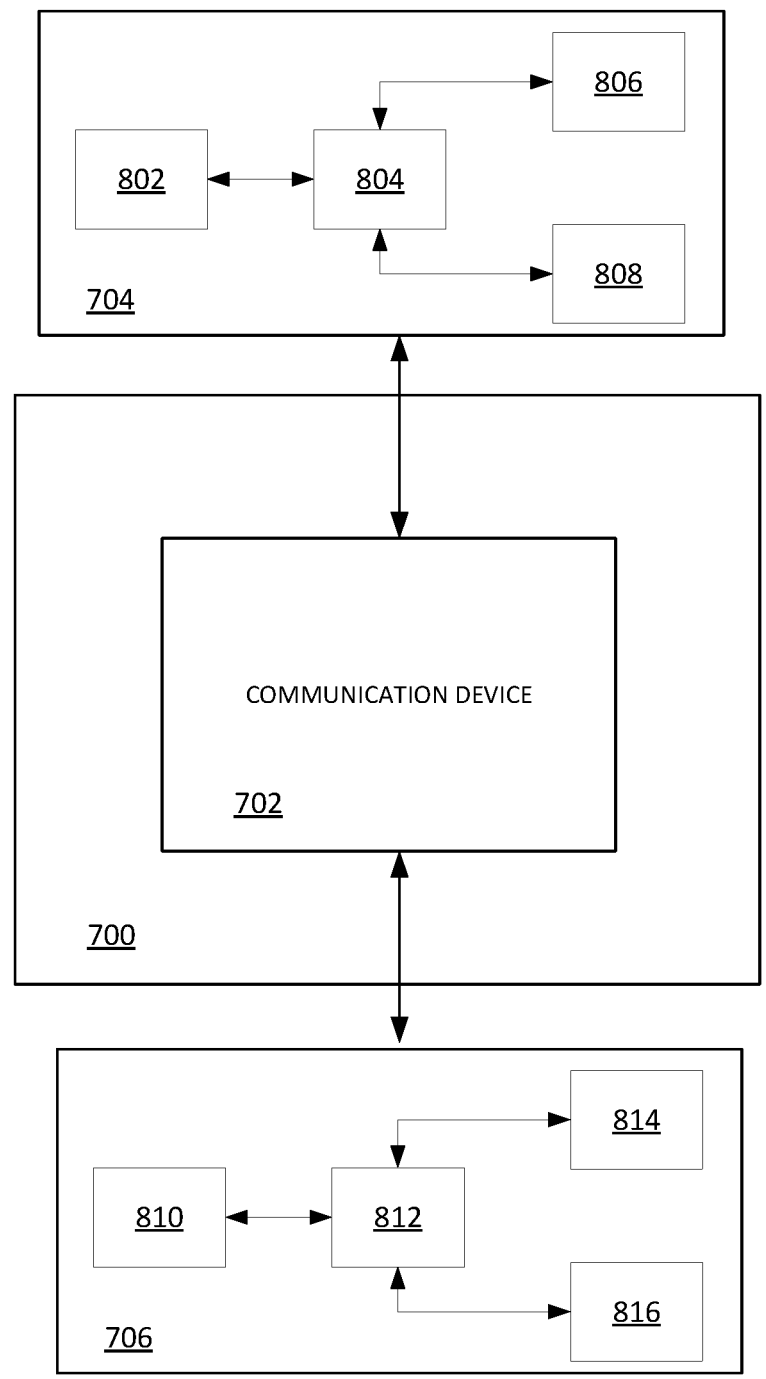
FIG. 8 is a block diagram of the system for facilitating the creating of the music in real time by the multiple users, in accordance with some embodiments.

FIG. 7 is a block diagram of a system 700 for facilitating creating of music in real time by multiple users, in accordance with some embodiments. Accordingly, the system 700 may include a communication device 702. Further, the communication device 702 may be configured for receiving one or more first music segment selections from a first user device 704 associated with a first user. Further, the one or more first music segment selections identifies one or more first music segments. Further, the communication device 702 may be configured for receiving one or more second music segment selections from a second user device 706 associated with a second user. Further, the one or more second music segment selections identifies one or more second music segments. Further, the one or more first music segments may be musically compatible with the one or more second music segments. Further, the communication device 702 may be configured for transmitting the one or more first music segment selections to the second user device 706. Further, the communication device 702 may be configured for transmitting the one or more second music segment selections to the first user device 704. Further, each of the first user device 704 and the second user device 706 may include a client-side storage device (802 and 810) (as shown in FIG. 8), a GPS receiver (806 and 814) (as shown in FIG. 8), a client-side processing device (804 and 812) (as shown in FIG. 8), and a sound reproduction device (808 and 816) (as shown in FIG. 8). Further, the client-side storage device (802 and 810) of each of the first user device 704 and the second user device 706 may be configured for retrieving the one or more first music segments. Further, the client-side storage device (802 and 810) of each of the first user device 704 and the second user device 706 may be configured for retrieving the one or more second music segments. Further, the GPS receiver (806 and 814) of each of the first user device 704 and the second user device 706 may be associated with a common clock source. Further, if the internet is available, the GPS receiver (806 and 814) may use a NTP (Network Time Protocol). If not, the GPS receiver (806 and 814) may use GPS timestamps from the mobile device (such as the first user device 704 and the second user device 706).

Further, the GPS receiver (806 and 814) of each of the first user device 704 and the second user device 706 may be configured for determining a universal time. Further, the client-side processing device (804 and 812) of each of the first user device 704 and the second user device 706 may be communicatively coupled with the client-side storage device (802 and 810) and the GPS receiver (806 and 814). Further, the client-side processing device (804 and 812) of each of the first user device 704 and the second user device 706 may be configured for synchronizing the one or more second music segments with the one or more first music segments to a common musical beat based on the universal time. Further, the client-side processing device (804 and 812) may include a GPS/GNSS chip, for the synchronizing without any internet connection. Further, the client-side processing device (804 and 812) of each of the first user device 704 and the second user device 706 may be configured for mixing the one or more second music segments with the one or more first music segments based on the synchronizing. Further, the sound reproduction device (808 and 816) may be communicatively coupled with the client-side processing device (804 and 812). Further, the sound reproduction device (808 and 816) of each of the first user device 704 and the second user device 706 may be configured for generating a mixed music may include the one or more first music segments and the one or more second music segments based on the mixing.

Further, in some embodiments, the communication device 702 may be configured for transmitting each of the one or more first music segments and the one or more second music segments to each of the first user device 704 and the second user device 706.

Figure 9:
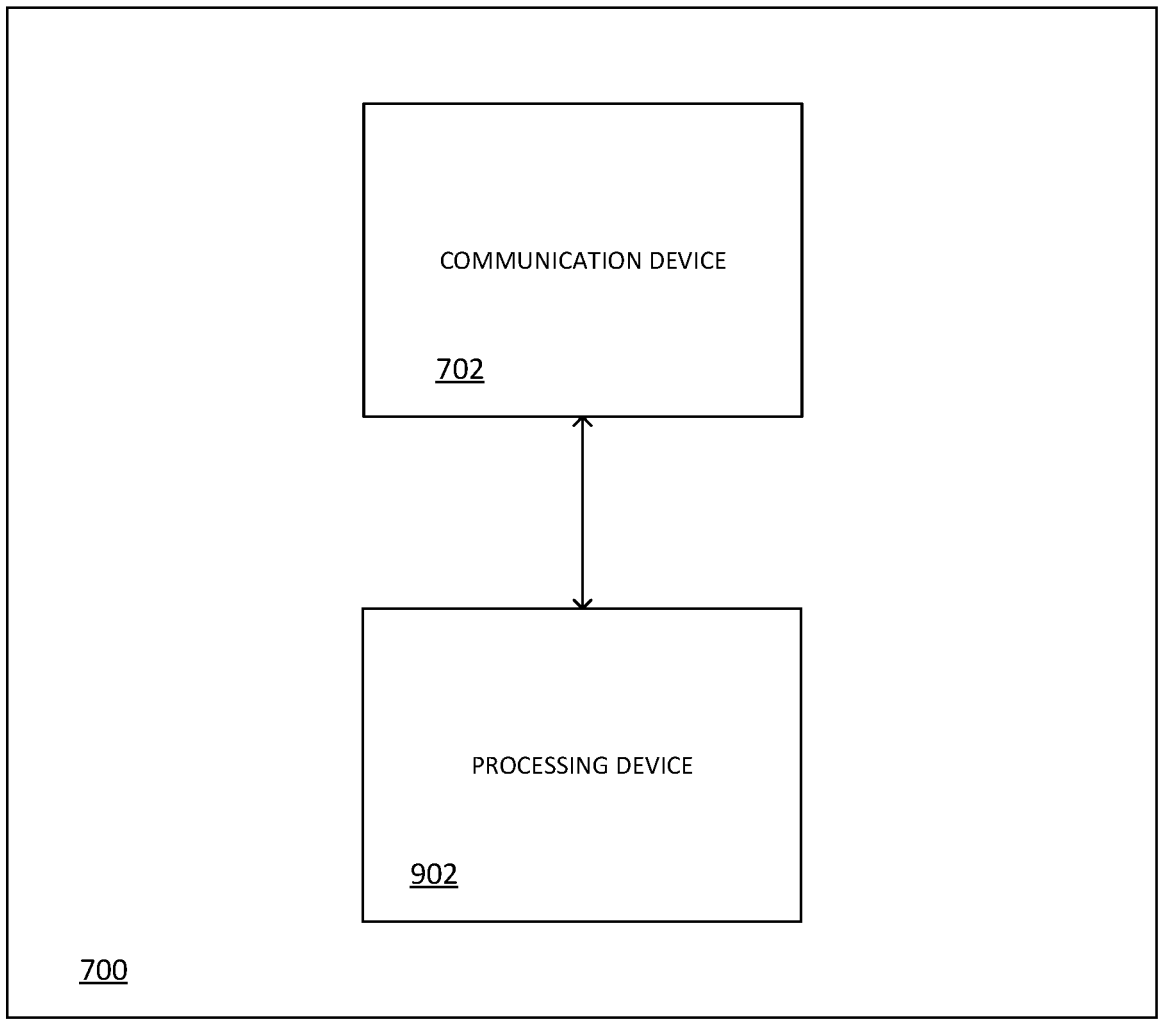
FIG. 9 is a block diagram of the system for facilitating the creating of the music in real time by the multiple users, in accordance with some embodiments.

In further embodiments, the system 700 may include a processing device 902, as shown in FIG. 9, communicatively coupled with the communication device 702. Further, the processing device 902 may be configured for analyzing a collection of music segments using machine learning. Further, each music segment may be characterized by a musical feature. Further, the processing device 902 may be configured for identifying the one or more first music segments and the one or more second music segments based on the analyzing.

Further, in an embodiment, the processing device 902 may be configured for extracting each of the musical feature for each music segment using a feature detection algorithm based on machine learning.

In further embodiments, the system 700 may include the processing device 902 communicatively coupled with the communication device 702. Further, the processing device 902 may be configured for analyzing a selected first music segment of the one or more first music segments. Further, the processing device 902 may be configured for identifying a recommended first music segment of the one or more first music segments based on the analyzing. Further, the communication device 702 may be configured for transmitting a recommendation to the first user device 704 based on the identifying. Further, the recommendation may include indication of the recommended first music segment.

Further, in an embodiment, the processing device 902 may be configured for analyzing the one or more second music segments. Further, the identifying of the recommended first music segment may be based on the analyzing of the one or more second music segments.

Further, in some embodiments, the one or more first music segments are associated with one or more first spatial locations. Further, the one or more second music segments are associated with one or more second spatial locations.

Further, the sound reproduction device (808 and 816) in each of the first user device 704 and the second user device 706 may be configured for reproducing the mixed music based on the one or more first spatial locations and the one or more second spatial locations.

Figure 10:
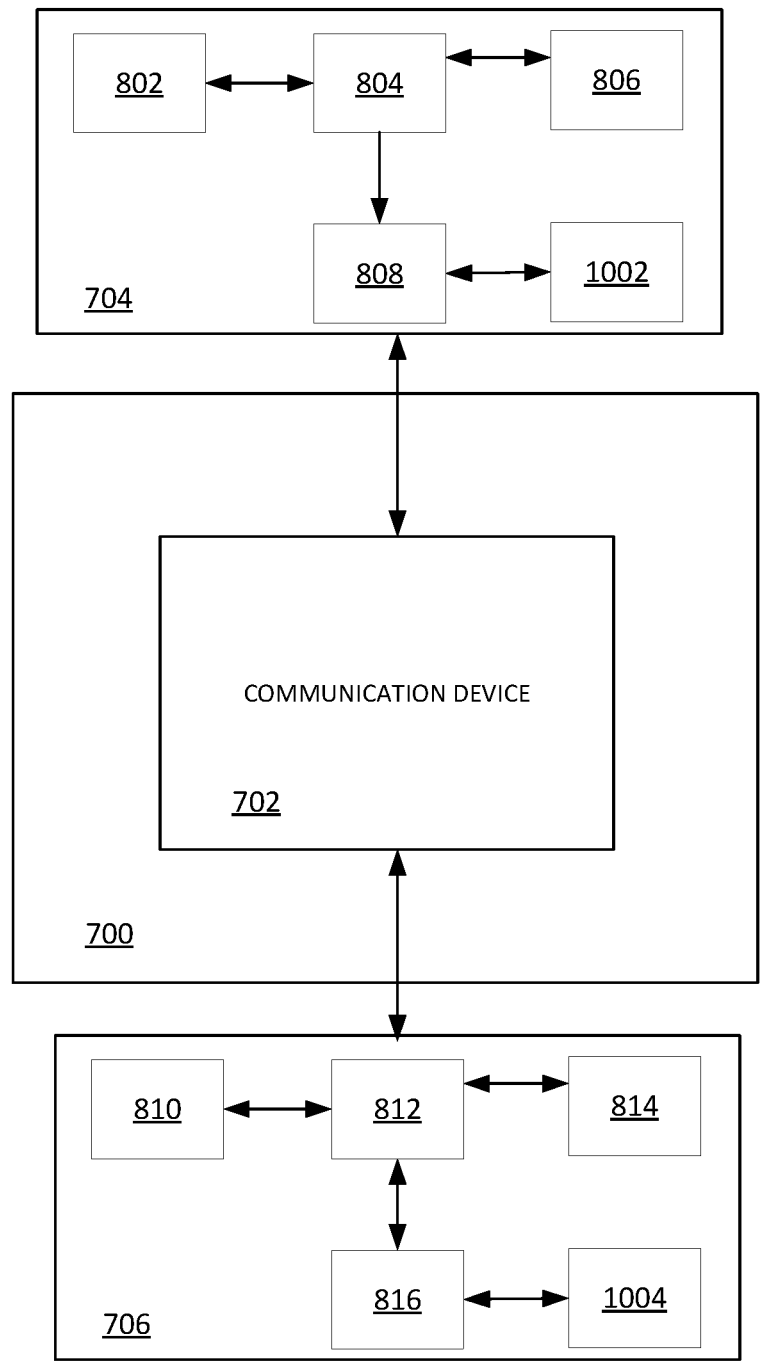
FIG. 10 is a block diagram of the system for facilitating the creating of the music in real time by the multiple users, in accordance with some embodiments.

Further, in an embodiment, each of the first user device 704 and the second user device 706 may include a motion sensor (1002 and 1004), as shown in FIG. 10, configured to sense a movement. Further, the motion sensor (1002 and 1004) may be communicatively coupled with the sound reproduction device (808 and 816). Further, the sound reproduction device (808 and 816) may be configured for reproducing the mixed music based on the movement.

Figure 11:
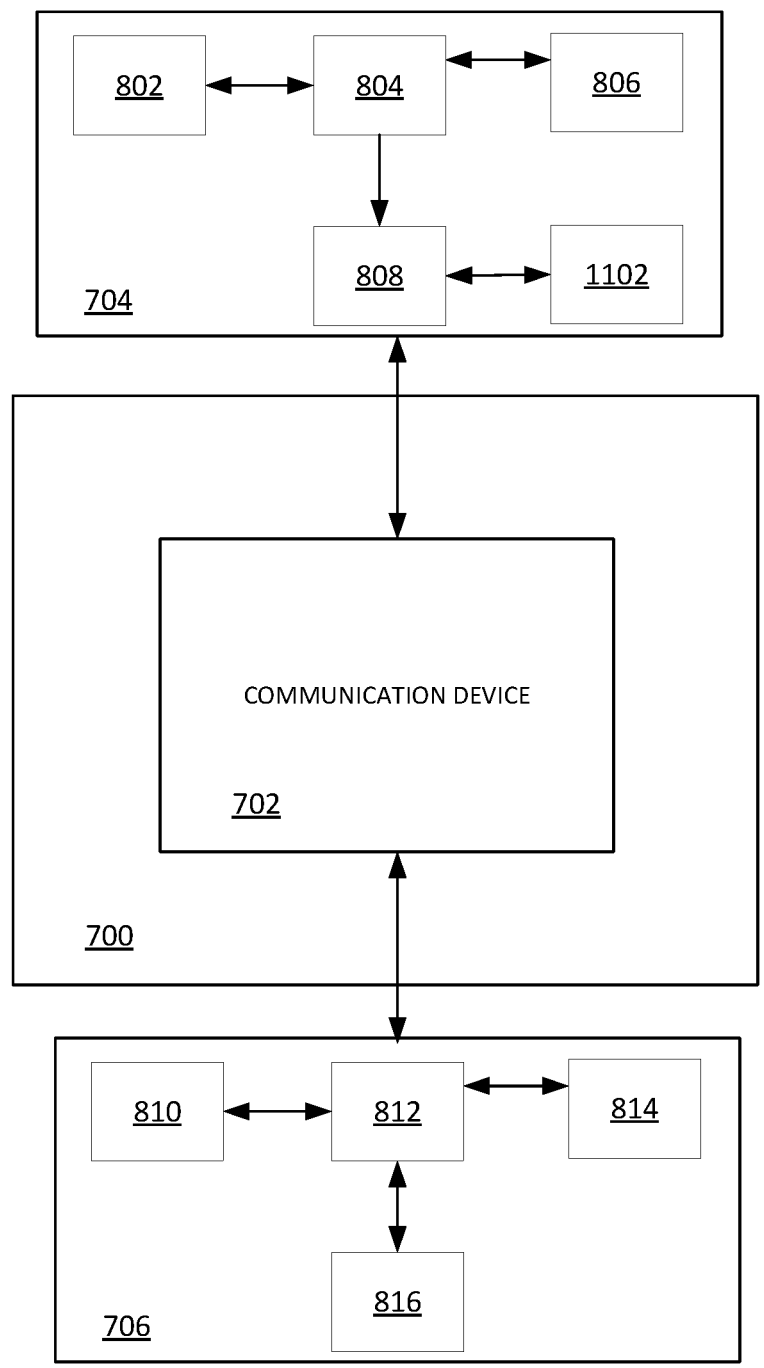
FIG. 11 is a block diagram of the system for facilitating the creating of the music in real time by the multiple users, in accordance with some embodiments.

Further, in some embodiments, the first user device 704 may include an input device 1102, as shown in FIG. 11. Further, the input device 1102 may be communicatively coupled with the sound reproduction device 808. Further, the input device 1102 of the first user device 704 may be configured for receiving a preview mode selection. Further, the mixed music generated by the first user device 704 may be based on receiving the preview mode. Further, the input device 1102 of the first user device 704 may be configured for receiving a join mode selection. Further, the communication device 702 may be configured for receiving the join mode selection from the first user device 704. Further, the transmitting of the first one or more music segments to the second user device 706 may be based on the receiving of the join mode selection.

Figure 12:
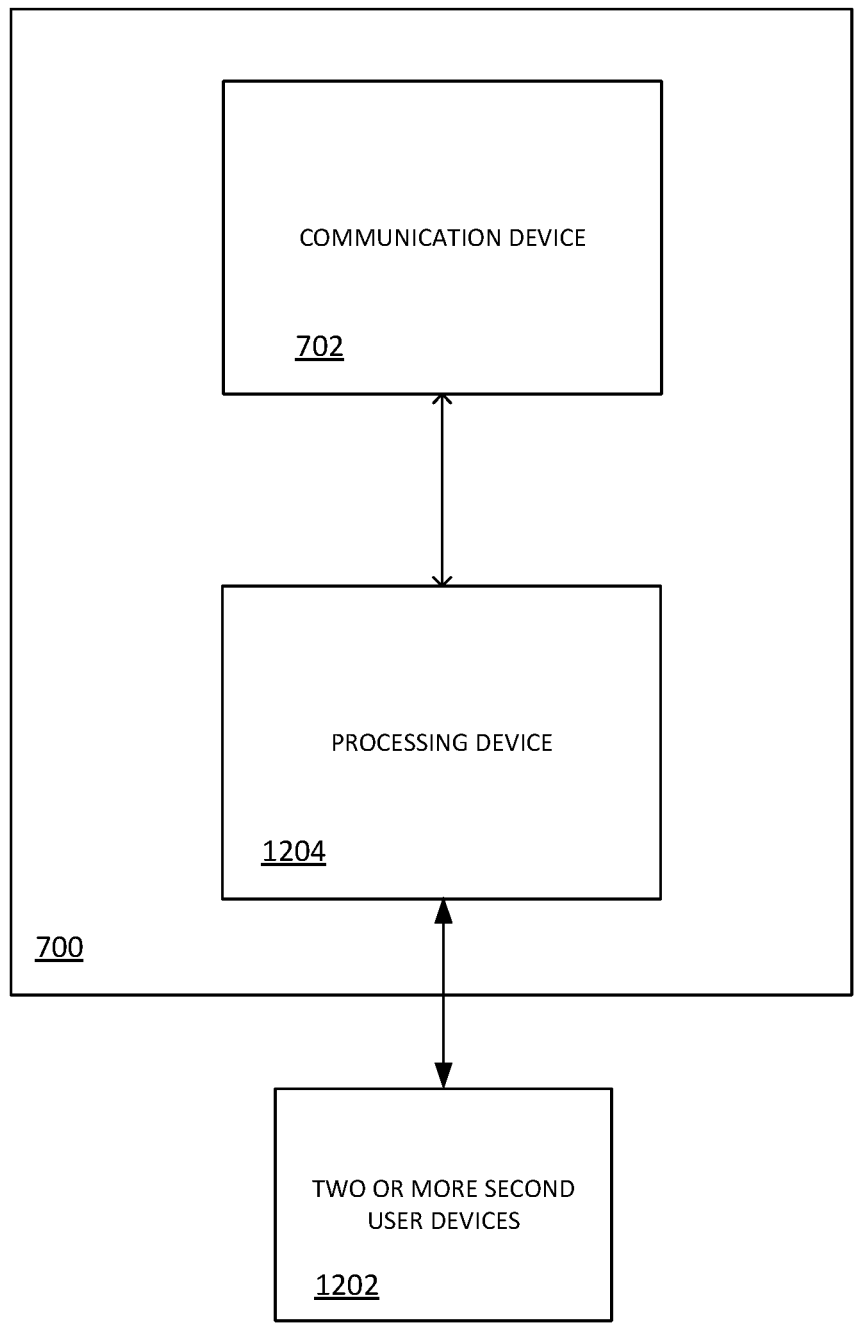
FIG. 12 is a block diagram of the system for facilitating the creating of the music in real time by the multiple users, in accordance with some embodiments.

Further, in some embodiments, the communication device 702 may be configured for receiving two or more requests from two or more second user devices 1202, as shown in FIG. 12, associated with two or more second users. Further, the two or more requests may include two or more second user information associated with the two or more second users. Further, the communication device 702 may be configured for transmitting a notification to the second user device 706. Further, the system 700 may include a processing device 1204, as shown in FIG. 12, communicatively coupled with the communication device 702. Further, the processing device 1204 may be configured for analyzing the two or more second user information based on one or more criteria. Further, the processing device 1204 may be configured for determining a fulfillment of the one or more criteria by a second user of the two or more second users based on the analyzing of the two or more second user information. Further, the processing device 1204 may be configured for identifying the second user from the two or more second users based on the fulfillment. Further, the processing device 1204 may be configured for generating the notification based on the identifying. Further, the notification may include an invitation for transmitting the one or more second music segment selections.

Further, in some embodiments, the synchronizing may include adjusting one or more musical characteristics of one or more of the one or more first music segments and the one or more second music segments on the one or more common musical beats. Further, the one or more musical characteristics may include a tempo, a pitch, a loudness, etc. Further, the mixing of the one or more second music segments with the one or more first music segments may be based on the adjusting.

FIG. 8 is a block diagram of the system 700 for facilitating the creating of the music in real time by the multiple users, in accordance with some embodiments.

FIG. 9 is a block diagram of the system 700 for facilitating the creating of the music in real time by the multiple users, in accordance with some embodiments.

FIG. 10 is a block diagram of the system 700 for facilitating the creating of the music in real time by the multiple users, in accordance with some embodiments.

FIG. 11 is a block diagram of the system 700 for facilitating the creating of the music in real time by the multiple users, in accordance with some embodiments.

FIG. 12 is a block diagram of the system 700 for facilitating the creating of the music in real time by the multiple users, in accordance with some embodiments.

Figure 13:
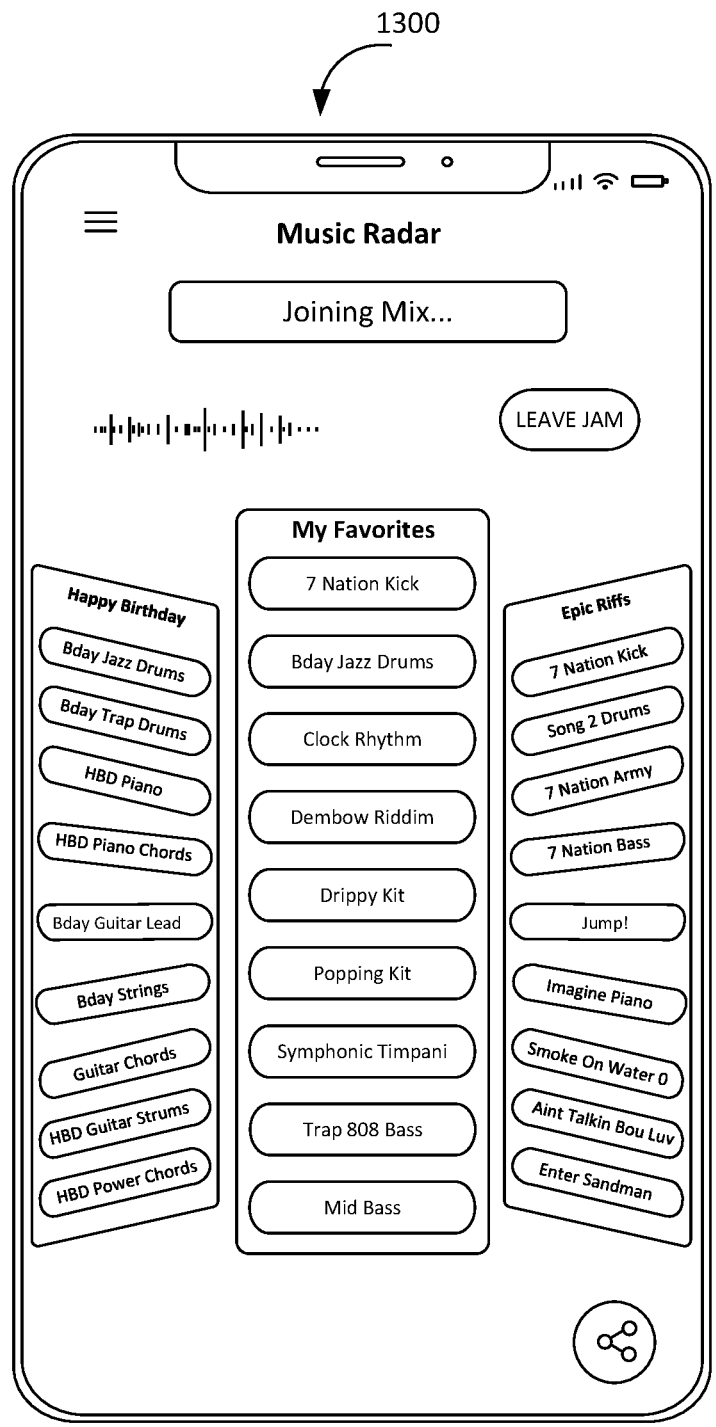
FIG. 13 is a screenshot of a user interface of a software platform associated with a system for creating social and spatial music using mobile devices, wherein the user interface making available a quiver of compatible musical segments for selection to preview privately, and optionally to join the common live mix, in accordance with some embodiments.

FIG. 13 is a screenshot of a user interface 1300 of a software platform associated with a system for creating social and spatial music using mobile devices, wherein the user interface 1300 making available a quiver of compatible musical segments for selection to preview privately, and optionally to join the common live mix, in accordance with some embodiments.

Figure 14:
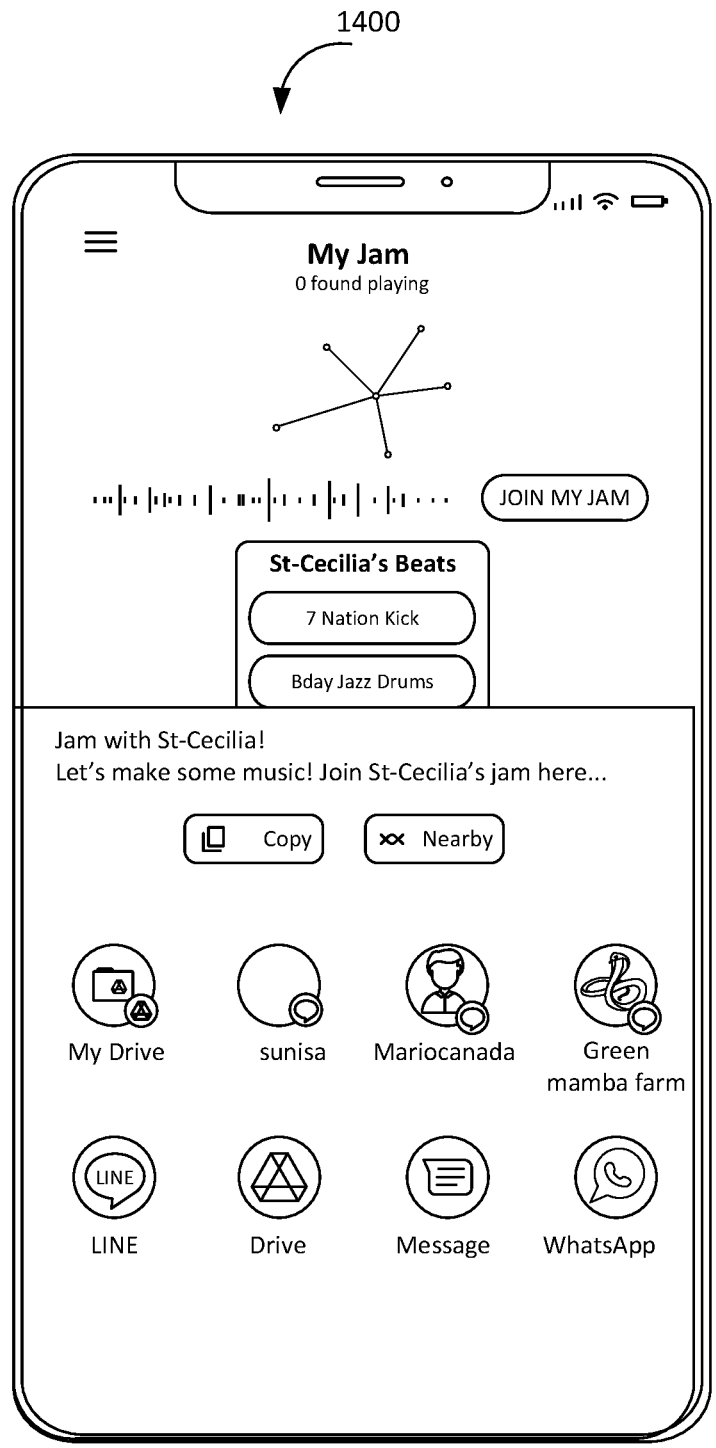
FIG. 14 is a screenshot of a user interface of the software platform associated with the system for creating social and spatial music using mobile devices, wherein the user interface is providing an invitation that may be sent or read by others to allow joining the common live mix, in accordance with some embodiments.

FIG. 14 is a screenshot of a user interface 1400 of the software platform associated with the system for creating social and spatial music using mobile devices, wherein the user interface 1400 is providing an invitation that may be sent or read by others to allow joining the common live mix, in accordance with some embodiments. Further, the user interface 1400 shows generation of invitation to join private jam session.

Figure 15:
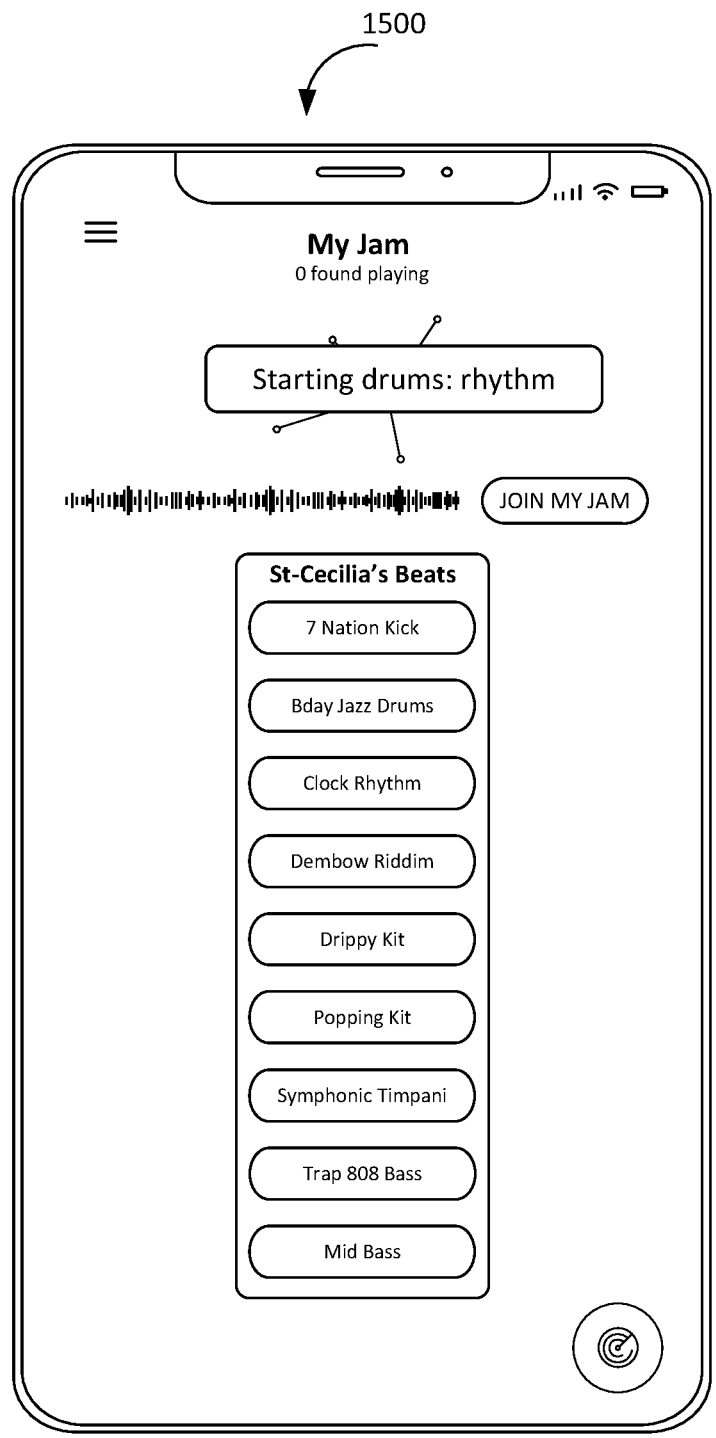
FIG. 15 is a screenshot of a user interface of the software platform associated with the system for creating social and spatial music using mobile devices, wherein the user interface is displaying information on the instrument type and musical role of a selected segment, in accordance with some embodiments.

FIG. 15 is a screenshot of a user interface 1500 of the software platform associated with the system for creating social and spatial music using mobile devices, wherein the user interface 1500 is displaying information on the instrument type and musical role of a selected segment, in accordance with some embodiments.

Figure 16:
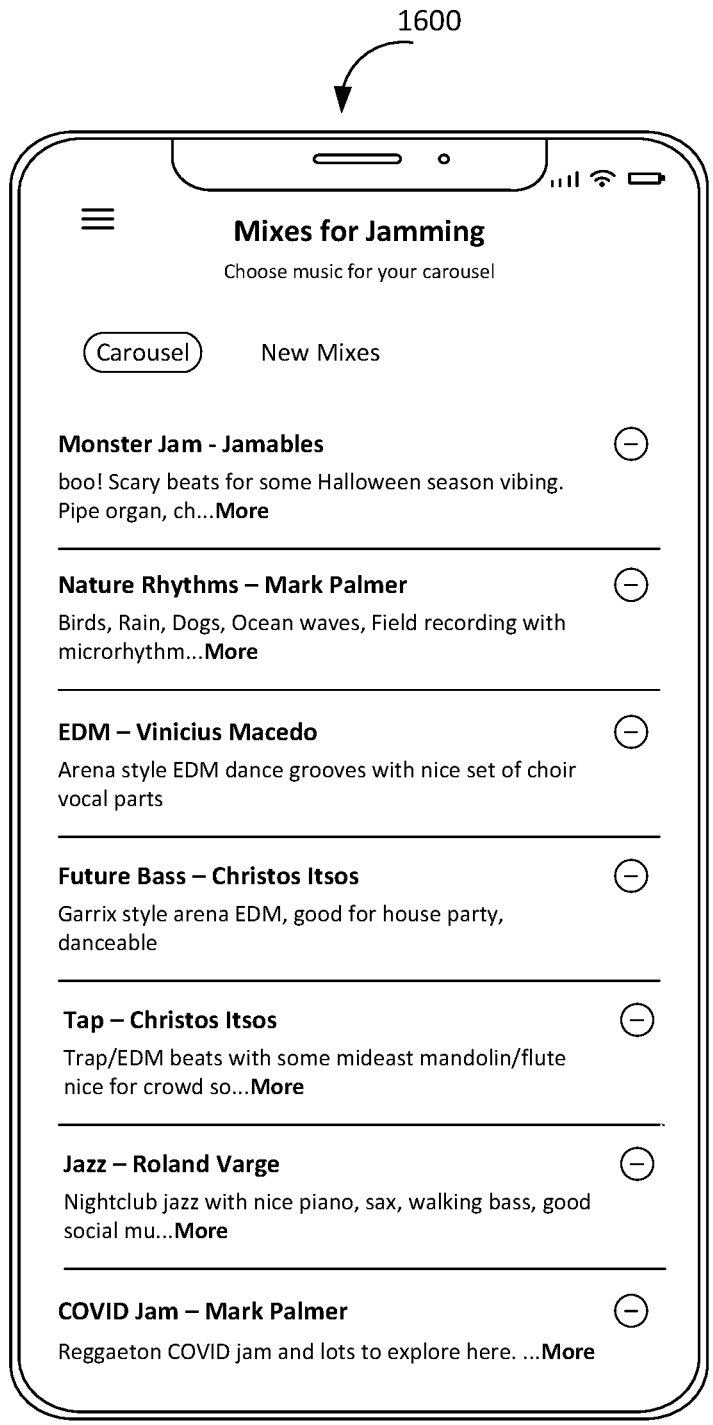
FIG. 16 is a screenshot of a user interface of the software platform associated with the system for creating social and spatial music using mobile devices, wherein the user interface is depicting the library of musical segment subsets organized by musical features and available for use in creating a common live mix, in accordance with some embodiments.

FIG. 16 is a screenshot of a user interface 1600 of the software platform associated with the system for creating social and spatial music using mobile devices, wherein the user interface 1600 is depicting the library of musical segment subsets organized by musical features and available for use in creating a common live mix, in accordance with some embodiments.

Figure 17:
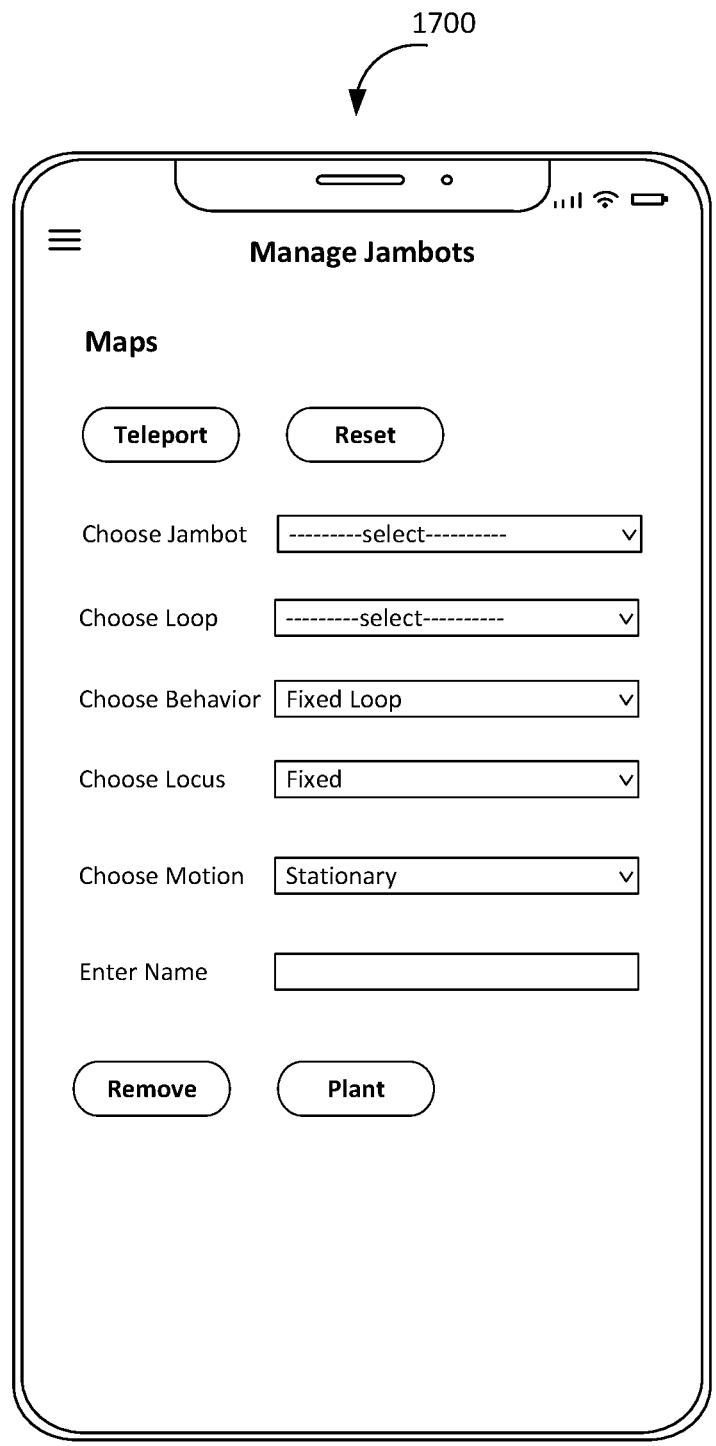
FIG. 17 is a screenshot of a user interface of the software platform associated with the system for creating social and spatial music using mobile devices, wherein the user interface is providing functions for managing automated instances of user participants, in accordance with some embodiments.

FIG. 17 is a screenshot of a user interface 1700 of the software platform associated with the system for creating social and spatial music using mobile devices, wherein the user interface 1700 is providing functions for managing automated instances of user participants, in accordance with some embodiments.

Figure 18:
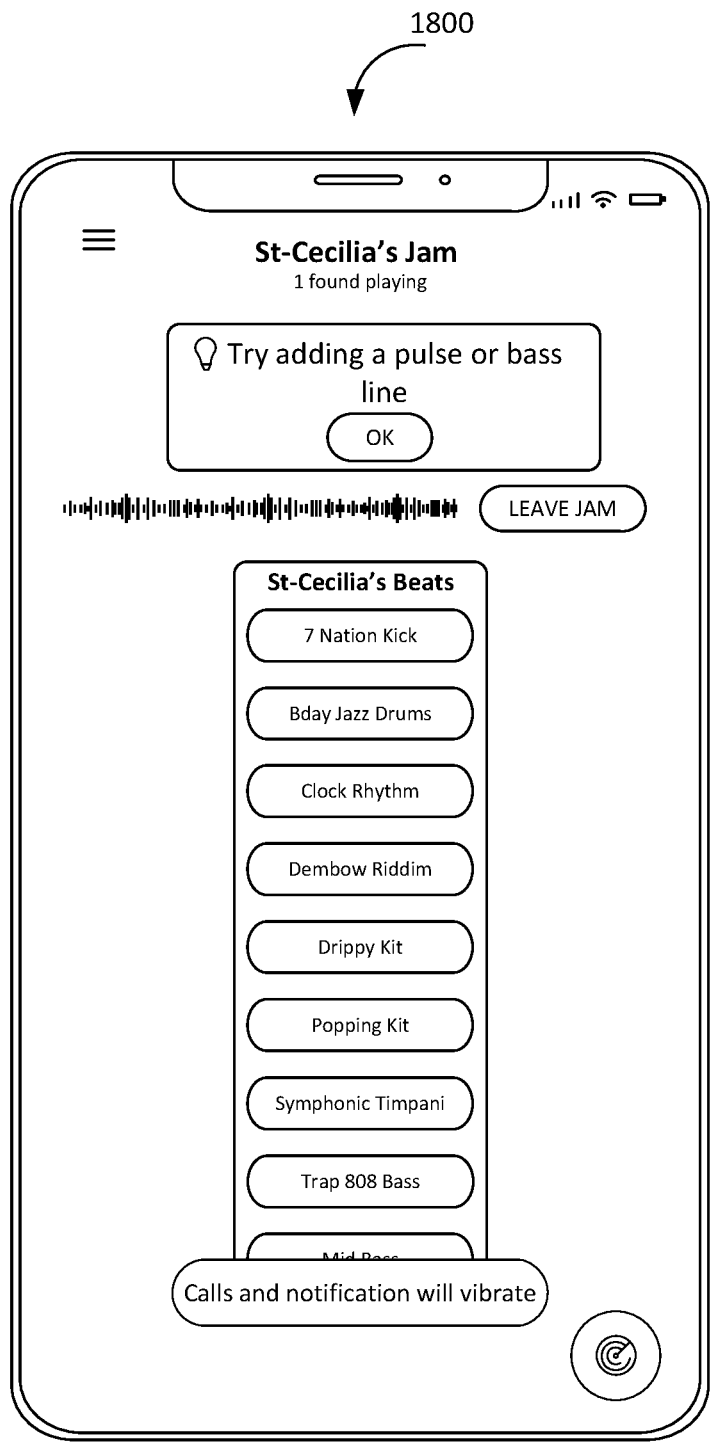
FIG. 18 is a screenshot of a user interface of the software platform associated with the system for creating social and spatial music using mobile devices, wherein the user interface is displaying an example of guidance to users regarding possible compatibility of a selected segment with the common live mix, in accordance with some embodiments.

FIG. 18 is a screenshot of a user interface 1800 of the software platform associated with the system for creating social and spatial music using mobile devices, wherein the user interface 1800 is displaying an example of guidance to users regarding possible compatibility of a selected segment with the common live mix, in accordance with some embodiments.

Figure 19:
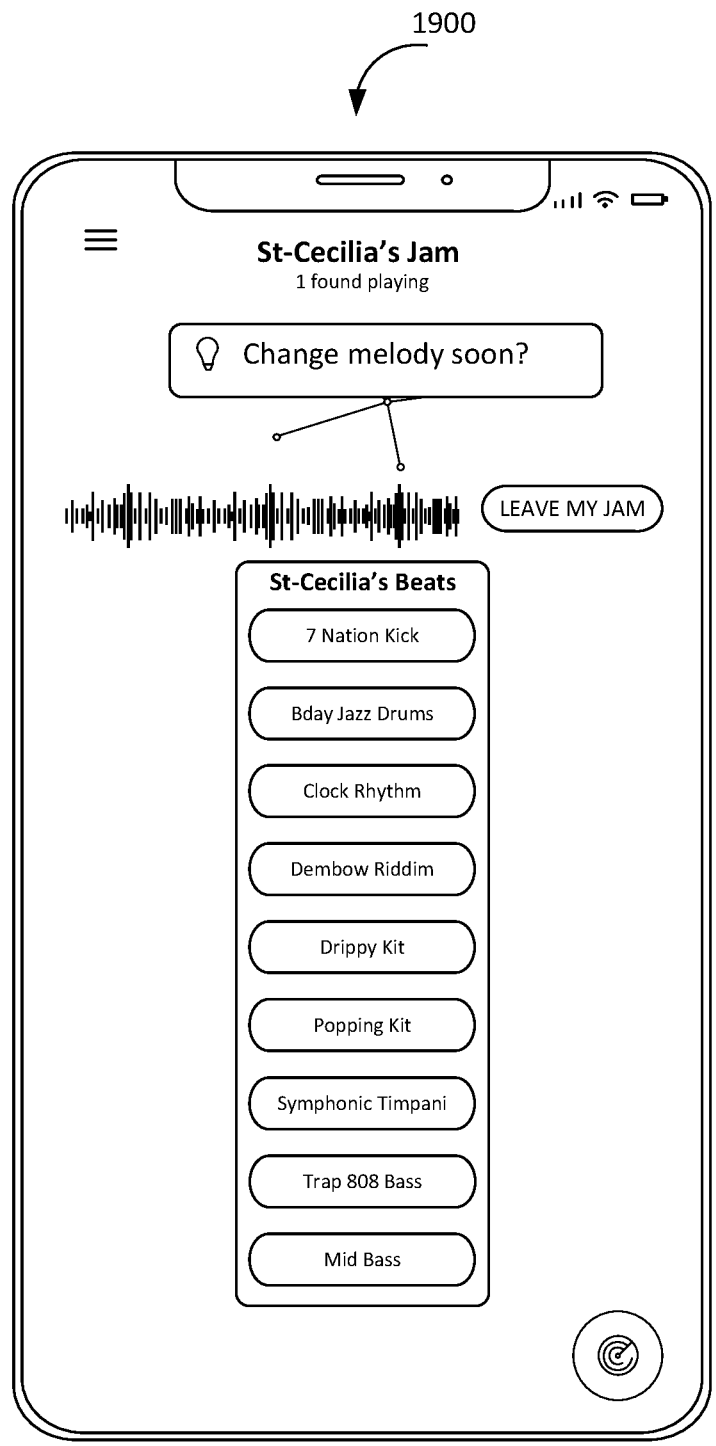
FIG. 19 is a screenshot of a user interface of the software platform associated with the system for creating social and spatial music using mobile devices, wherein the user interface is displaying an example of guidance to users regarding possible compatibility of a selected segment with the common live mix, in accordance with some embodiments.

FIG. 19 is a screenshot of a user interface 1900 of the software platform associated with the system for creating social and spatial music using mobile devices, wherein the user interface 1900 is displaying an example of guidance to users regarding possible compatibility of a selected segment with the common live mix, in accordance with some embodiments.

Figure 20:
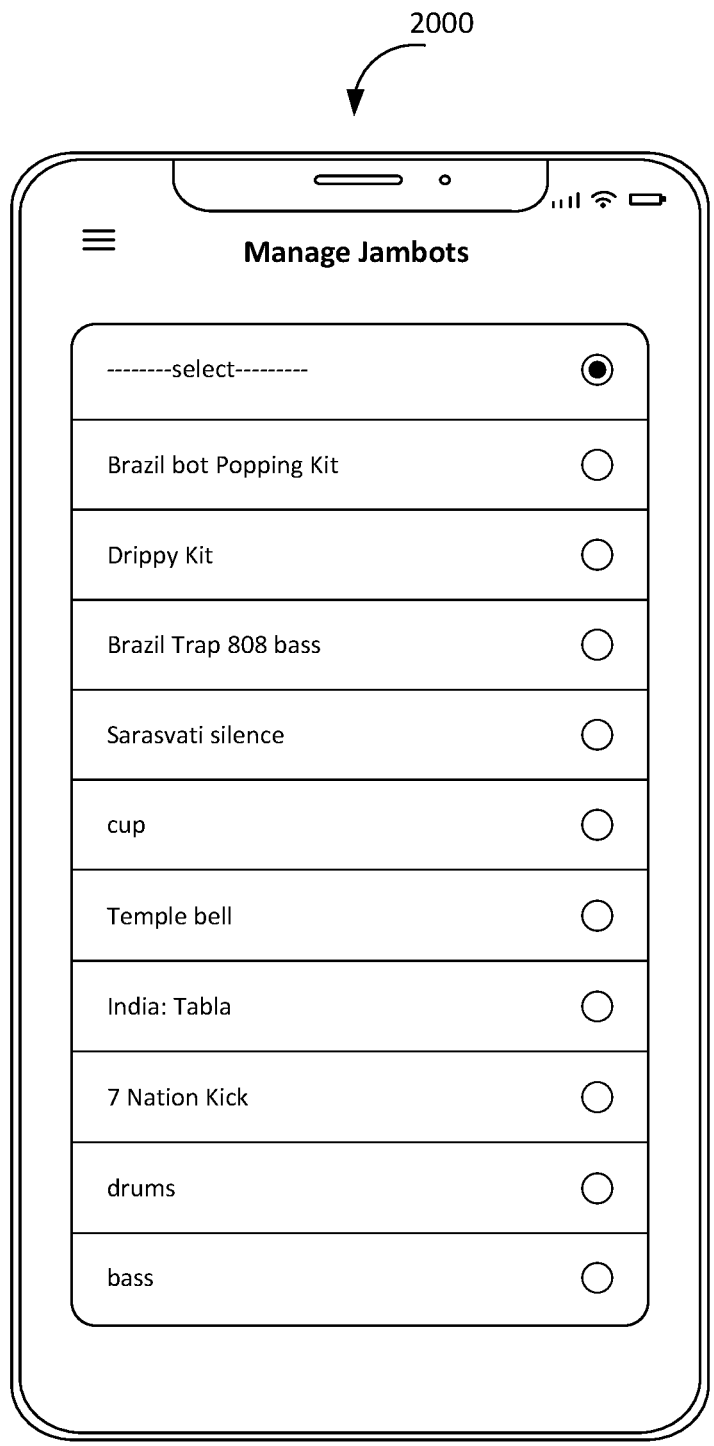
FIG. 20 is a screenshot of a user interface of the software platform associated with the system for creating social and spatial music using mobile devices, wherein the user interface is displaying functions available to manage a collection of automated user instances, in accordance with some embodiments.

FIG. 20 is a screenshot of a user interface 2000 of the software platform associated with the system for creating social and spatial music using mobile devices, wherein the user interface 2000 is displaying functions available to manage a collection of automated user instances, in accordance with some embodiments.

Figure 21:
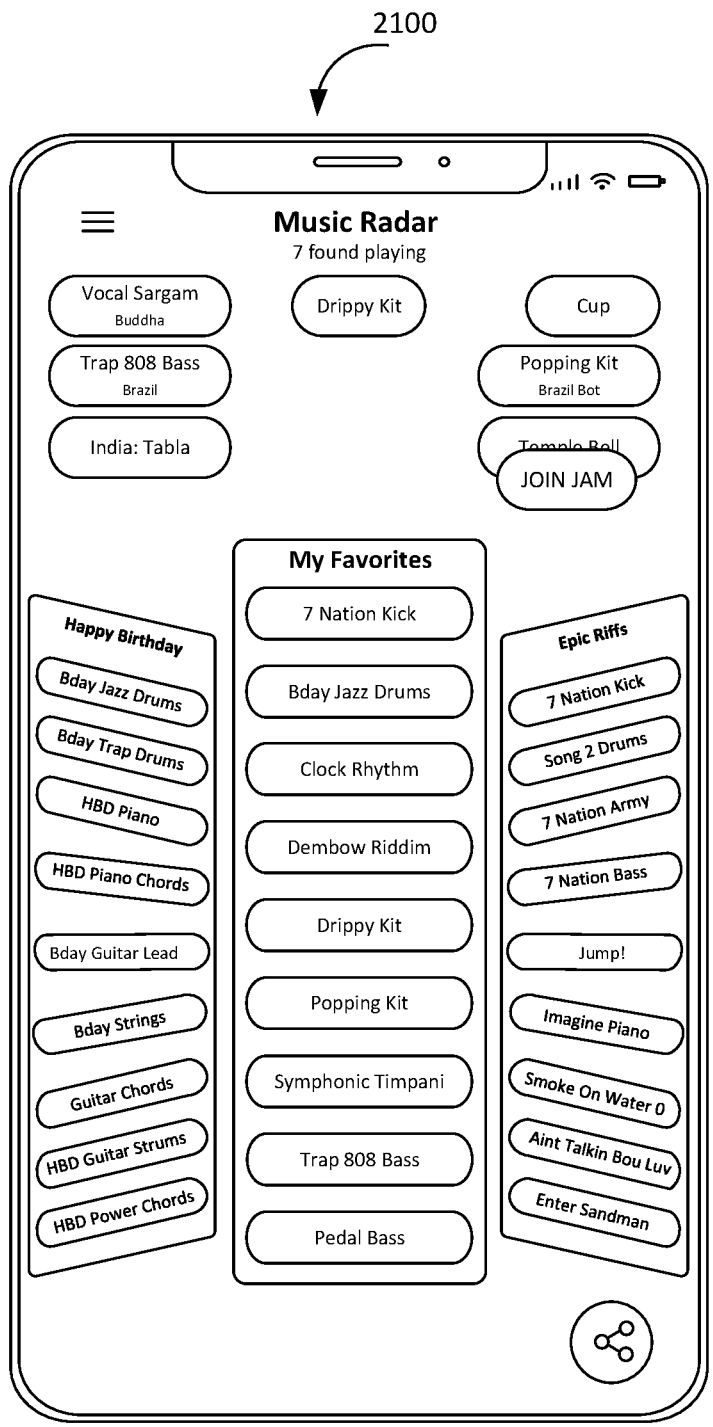
FIG. 21 is a screenshot of a user interface of the software platform associated with the system for creating social and spatial music using mobile devices, wherein the user interface is displaying information about participants and their segment selections in the common live mix, where the first user is not adding a segment to the mix, in accordance with some embodiments.

FIG. 21 is a screenshot of a user interface 2100 of the software platform associated with the system for creating social and spatial music using mobile devices, wherein the user interface 2100 is displaying information about participants and their segment selections in the common live mix, where the first user is not adding a segment to the mix, in accordance with some embodiments.

Figure 22:
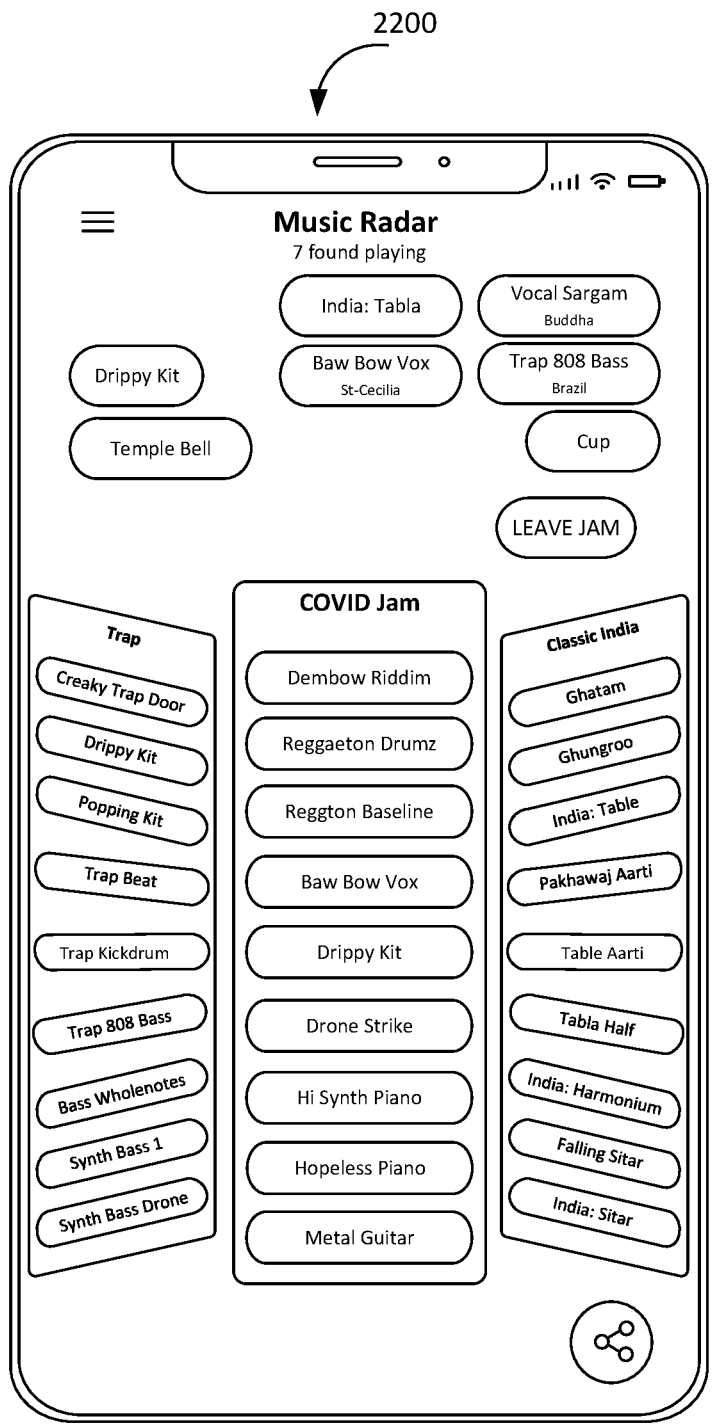
FIG. 22 is a screenshot of a user interface of the software platform associated with the system for creating social and spatial music using mobile devices, wherein the user interface is displaying information about current automated participants and their segment selections in the common live mix, in accordance with some embodiments.

FIG. 22 is a screenshot of a user interface 2200 of the software platform associated with the system for creating social and spatial music using mobile devices, wherein the user interface 2200 is displaying information about current automated participants and their segment selections in the common live mix, in accordance with some embodiments.

Figure 23:
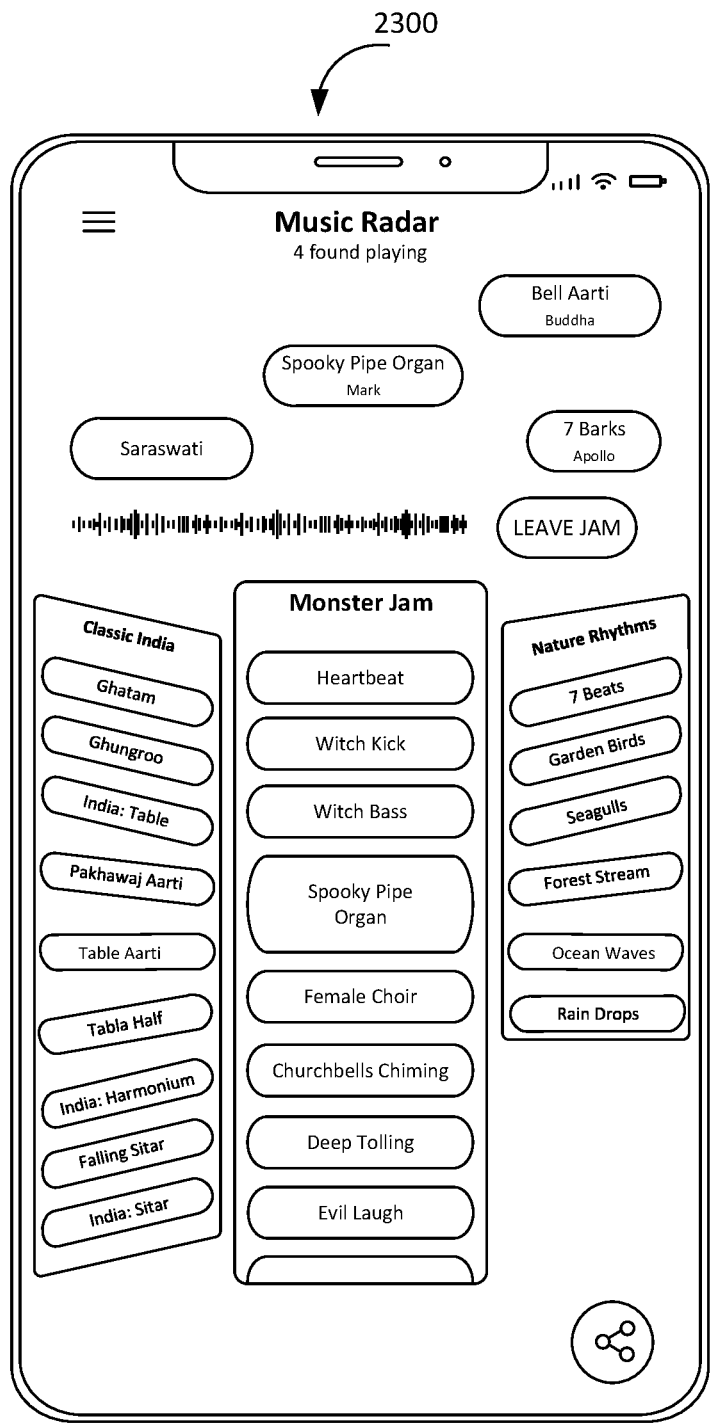
FIG. 23 is a screenshot of a user interface of the software platform associated with the system for creating social and spatial music using mobile devices, wherein the user interface is displaying information about participants and their segment selections in the common live mix, where the first user is adding a segment to the mix, in accordance with some embodiments.

FIG. 23 is a screenshot of a user interface 2300 of the software platform associated with the system for creating social and spatial music using mobile devices, wherein the user interface 2300 is displaying information about participants and their segment selections in the common live mix, where the first user is adding a segment to the mix, in accordance with some embodiments.

Figure 24:
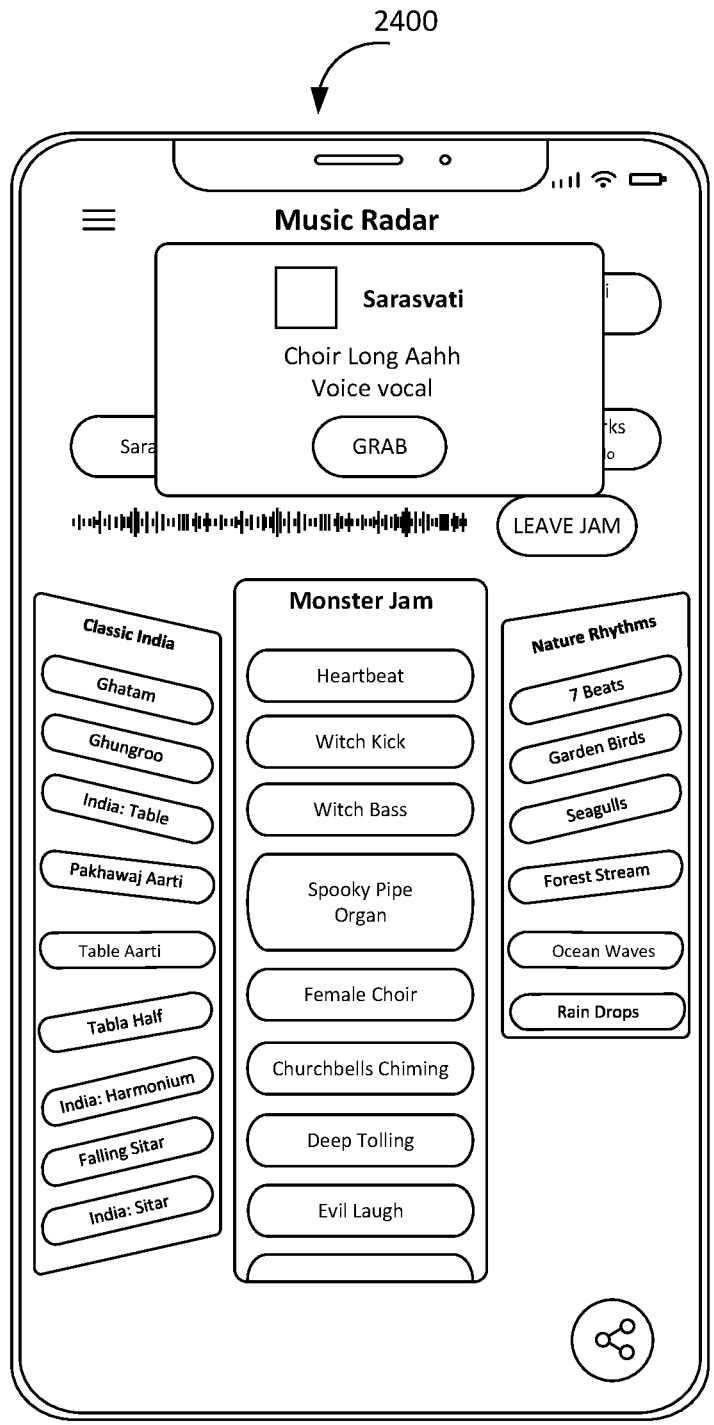
FIG. 24 is a screenshot of a user interface of the software platform associated with the system for creating social and spatial music using mobile devices, wherein the user interface is displaying information about one selected second user and their segment selection, and providing a way to add the set of related compatible segments from the second user to the quiver of the first user, in accordance with some embodiments.

FIG. 24 is a screenshot of a user interface 2400 of the software platform associated with the system for creating social and spatial music using mobile devices, wherein the user interface 2400 is displaying information about one selected second user and their segment selection, and providing a way to add the set of related compatible segments from the second user to the quiver of the first user, in accordance with some embodiments.

Figure 25:
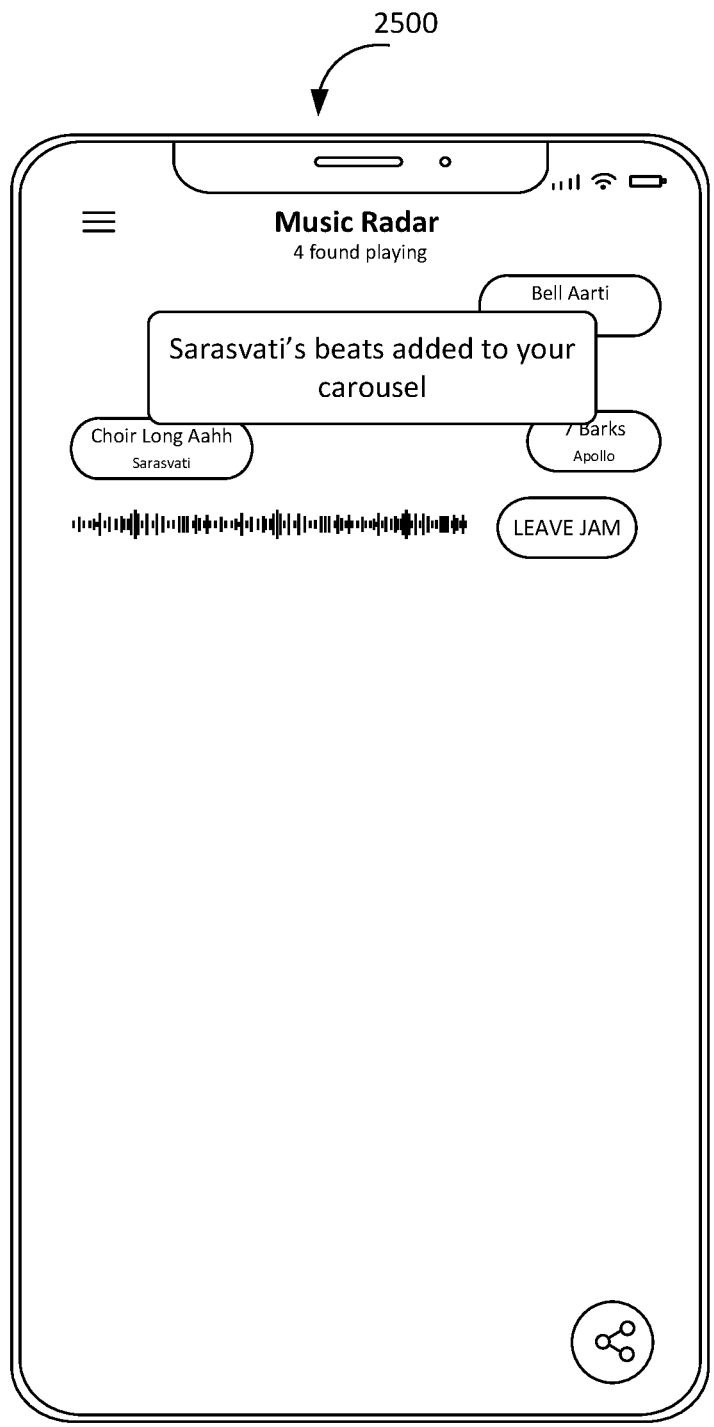
FIG. 25 is a screenshot of a user interface of the software platform associated with the system for creating social and spatial music using mobile devices, wherein the user interface is depicting a confirmation after a second user's beat set selection has been added to the quiver of the first user during a live music session, in accordance with some embodiments.

FIG. 25 is a screenshot of a user interface 2500 of the software platform associated with the system for creating social and spatial music using mobile devices, wherein the user interface 2500 is depicting a confirmation after a second user's beat set selection has been added to the quiver of the first user during a live music session, in accordance with some embodiments.

Figure 26:
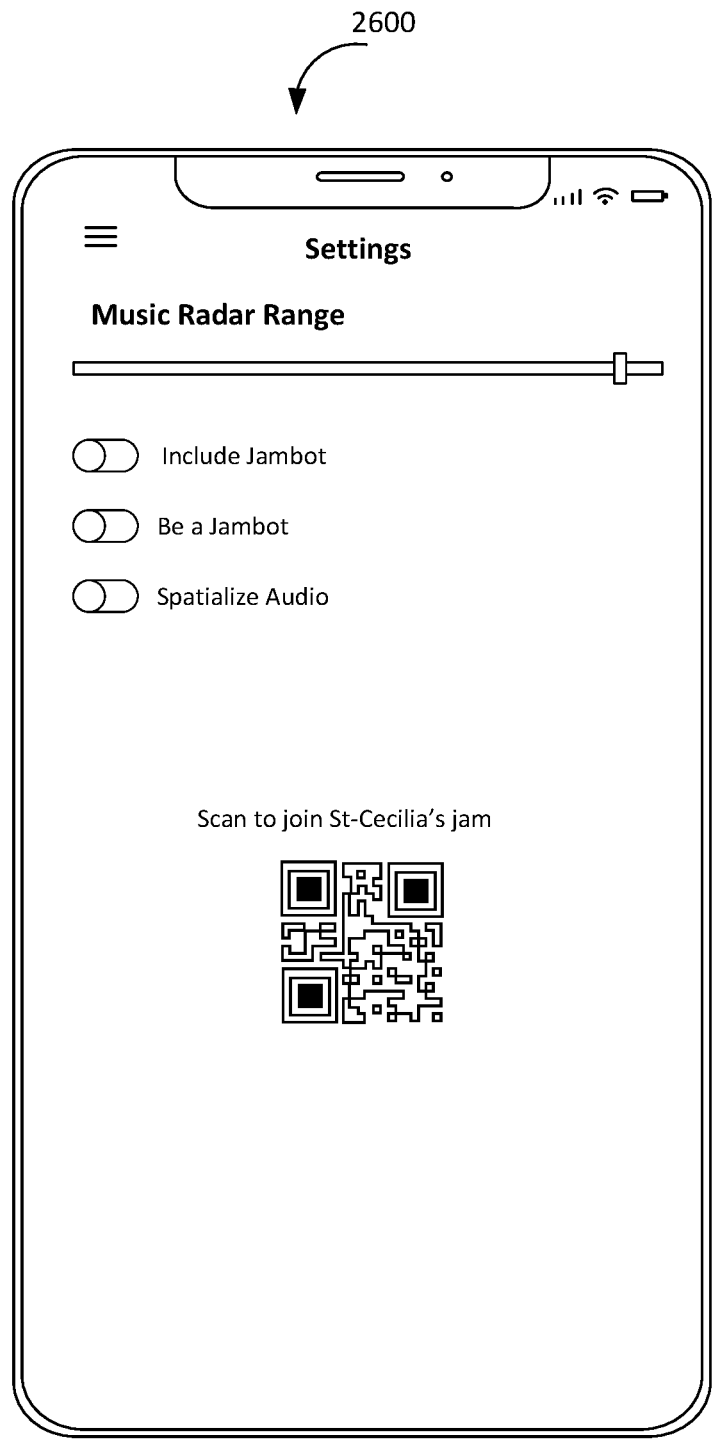
FIG. 26 is a screenshot of a user interface of the software platform associated with the system for creating social and spatial music using mobile devices, wherein the user interface is displaying options to control inclusion of second users by distance, automation, and to select automatic operation for the first user, in accordance with some embodiments.

FIG. 26 is a screenshot of a user interface 2600 of the software platform associated with the system for creating social and spatial music using mobile devices, wherein the user interface 2600 is displaying options to control inclusion of second users by distance, automation, and to select automatic operation for the first user, in accordance with some embodiments.

Figure 27:
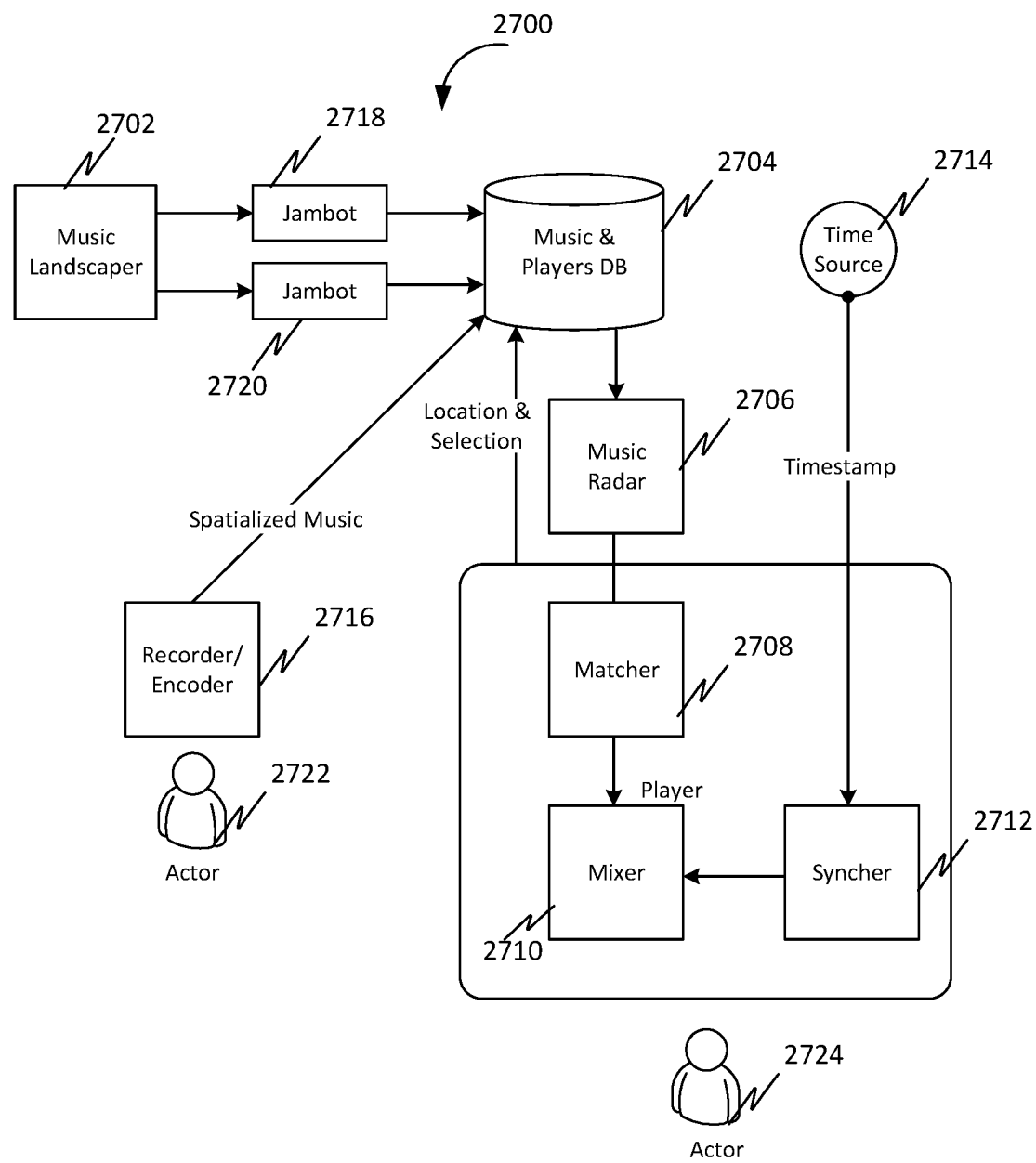
FIG. 27 is a schematic of a system for creating social and spatial music using mobile devices in accordance with some embodiments.

FIG. 27 is a schematic of a system 2700 for creating social and spatial music using mobile devices in accordance with some embodiments. Accordingly, the system 2700 may include a music landscaper 2702, a music and player DB 2704, a music radar 2706, a matcher 2708, a mixer 2710, a syncher 2712, a time source 2714, and a recorder encoder 2716.

The component parts of the system 2700 such as player (or the music and player DB 2704) and the music radar 2706 are shown in sequence, giving a demonstration of how the components interact to allow collaborative music mixing for a group. Further, the system 2700 may be associated with a jambot 2718 and a second jambot 2720. Further, the system 2700 may be associated with an actor 2722 and a second actor 2724.

Figure 28:
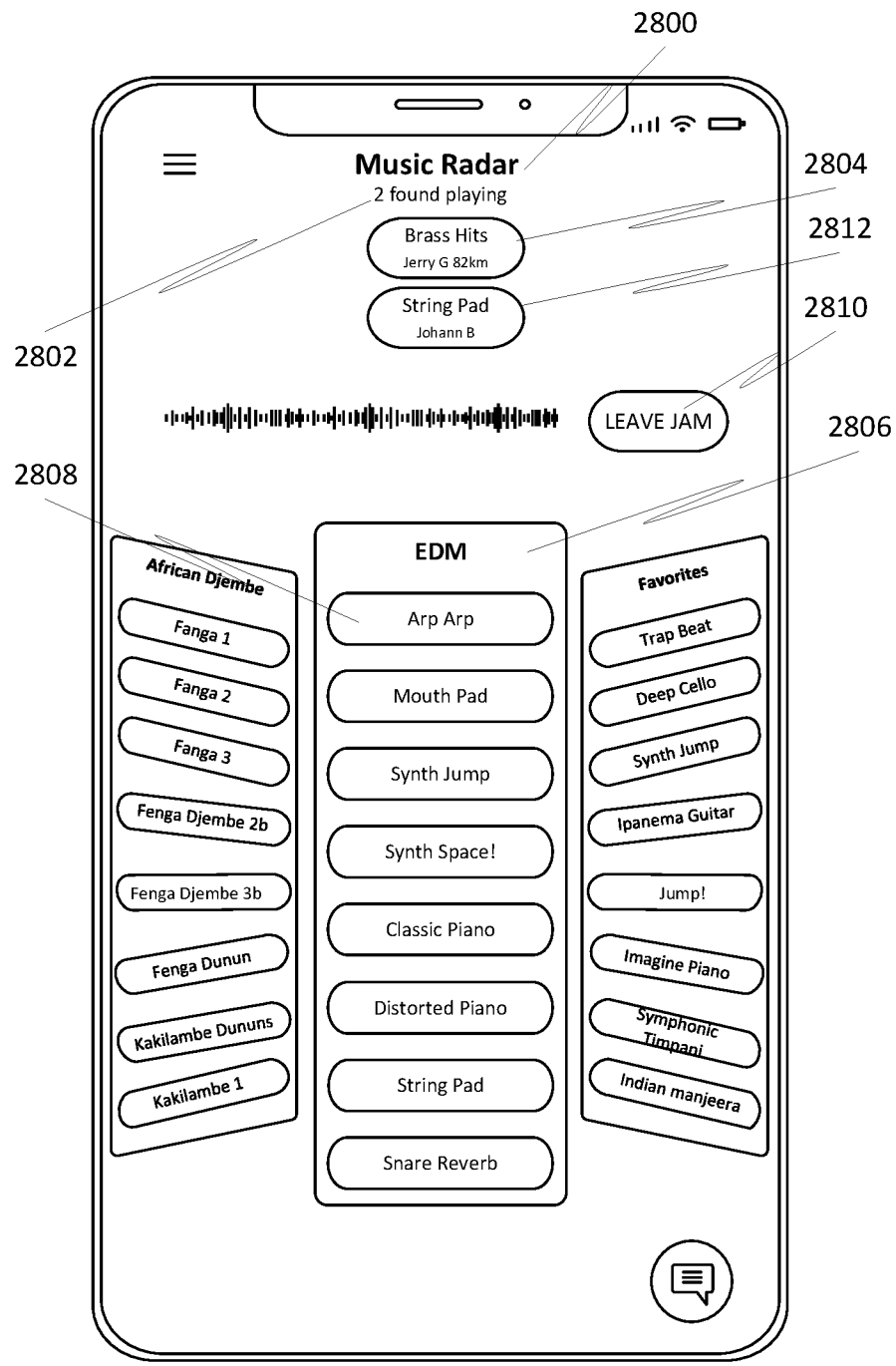
FIG. 28 is a screenshot of a music radar user interface of the software platform associated with the system for creating social and spatial music using mobile devices, in accordance with some embodiments.

FIG. 28 is a screenshot of a music radar user interface 2800 of the software platform associated with the system 2700 for creating social and spatial music using mobile devices, in accordance with some embodiments. The music radar interface 2800 shows a number of players 2802, player identities 2812 and location 2804, a music database 2806, segments 2808, and gives an option to leave a Jam 2810.

According to some aspects, a method for synchronizing different musical segments, playing on different devices, having a common tempo and compatible meters is disclosed. Further, the method may include reading the time in milliseconds (e.g., UTC), from a shared source such as synchronized device time, GNSS device time, or NTP network time. Further, the method may include receiving an input track of music, said input track consisting of one or more Measures, having musical properties of a) Tempo, in Beats Per Minute, and b) Count, as beats per measure, and Duration. Further, the method may include extracting features of Tempo and Count from the input track by reading its metadata, or by calculating the features by applying a feature detection algorithm. Further, the method may include calculating the target time for the next "bar"—i.e, ending the current measure and beginning the next. Further, the method may include calculating the time remaining until the next-bar time by subtracting the current time from next-bar time. Further, the method may include supplying as output: a) a Next Measure Start (NMS), in TSE milliseconds, at which to end playing of the current measure and begin the next measure, and b) a Track Index TI, indicating the elapsed time since the current measure started. Further, the method may include playing, immediately, the input track starting at offset TI, until time NMS (or, maybe it's the music player which relies on output from UMS which actually does the Play step).

According to some aspects, a method for participating in spontaneously creating music in real time is disclosed. Further, the method may include providing a user interface to a plurality of users connected over a network, wherein the providing of the application interface may include presenting sets of musical segments for selection by a first user, each set grouping segments by compatible musical features. Further, the method may include receiving a first selection from a first user, the first selection establishing an audio track having a musical instrument type, a tempo, and a musical role for the track, each audio track being also playable by other users connected to the user interface. Further, the method may include receiving at least one additional segment selection from the at least one additional user connected to the interface, the at least one additional selection establishing an additional part playable by other users connected to the user interface. Further, the method may include adding the synchronized at least one additional part to the resulting mixed track by overlaying it on the first part to play simultaneously with the first part. Further, the method may include synchronizing the at least one additional part to the shared clock time using the UMS algorithm using a clock available to the first user and the at least one additional user to synchronize the beats of the resulting audio outputs between devices (multiple users playing the same mix, but off synch with the others is prevented by synchronizing the beats of the resulting audio outputs between devices).

According to further aspects of the method for participating in spontaneously creating music in real time, wherein receiving the first selection from the first user and additional selections from the at least one additional user are limited to users in a selected geographic location.

According to further aspects of the method for participating in spontaneously creating music in real time, wherein receiving at least one additional selection set from at least one additional user is limited to users who are included by the first user who acts as Host to share a common invitation link and related invitation information such as start time, theme, etc.

According to further aspects of the method for participating in spontaneously creating music in real time, wherein receiving at least one additional selection set from at least one additional user is limited to users who are discovered according to selection criteria.

According to further aspects of the method for participating in spontaneously creating music in real time, wherein displaying the at least one additional user and their choice of a segment and allowing the first user to immediately add the set of compatible segments compatible with the additional user's segment, to the quiver holder of the first user and make the set of compatible segments available for selection by the first user.

According to further aspects of the method for participating in spontaneously creating music in real time, wherein the providing of the user interface comprises providing the user with a holder of selectable segments most likely to add to the resulting mixed track, including a list of most-frequently-added segments. Further, the carousel quiver is one implementation for the interface design. The important functionality includes providing some way of making a small subset of segments sets quickly accessible to the user. The quiver also includes a special list of the segments most used ("favorites") as those used most recently are most likely to be invoked again.

According to further aspects of the method for participating in spontaneously creating music in real time, wherein the first part is removed from the shared resulting mixed track by the action of the first user who selected the first part but continues to play privately for the first user, along with the mix.

According to further aspects of the method for participating in spontaneously creating music in real time, wherein the at least one additional part being replaced by a subsequently selected segment in the resulting mixed track by request of the at least one additional user who selected the part. Further, each selected segment/loop/track can be played privately (previewed) by the user, overlaid against the shared resulting mix track, but the first user's individual selection does not yet appear to the other users, until the first user press JOIN. This lets the user browse through potential selections allowing the user to experience sound/music when shared in the mix, to find a good match.

According to further aspects of the method for participating in spontaneously creating music in real time, wherein providing a user interface further comprises: receiving a geographical selection from the first user; presenting to the first user a communication medium; and receiving from the first user an invitation for the at least one additional user, and inviting the additional user to invite to generate said additional part.

According to further aspects of the method for participating in spontaneously creating music in real time, wherein receiving a first set of selections from a first user comprises selections from an instrument category and a musical role as metadata of the first part, then used to guide the first user to potential combinations of instruments and musically compatible roles, in advance of the said user joining the selected segment to the resulting shared mix According to further aspects of the method for participating in spontaneously creating music in real time, wherein receiving a first set of selections from the at least one additional user includes positive or negative feedback regarding the selections of the other users.

According to further aspects of the method for participating in spontaneously creating music in real time, wherein feedback received from other users regarding selection made by the first user, is used to govern the relative volumes of the first user's selection in the resulting mixed track.

According to further aspects of the method for participating in spontaneously creating music in real time, the audio track fades in volume as the first user or the at least one additional user moves further apart, then leaves the search radius, and conversely, fades louder in volume when moving closer, also maintaining spatial directionality in the mix. Further, the spatial orientation is preserved. If either user is listening on headphones that support spatial audio, if they rotate, they will hear the at least one additional user shift from the right to the left side. This applies vertically by height as well. if the user goes to the top of a building, the other mixed parts will appear to be playing below their feet. The segments themselves may include metadata about spatial position and movement. So, even if the users remain stationary, they may have selected a track that encodes spatial music for spatial audio. For example, the first user plays a track of an ambulance siren that appears to drive in circles relative to a geographic point.

According to some aspects, a method of automating the creation of interactive music experience is disclosed. Further, the method may include providing interfaces (API and GUI) by which to receive at least one set of musical segments and sets of rules governing how and when to play. Further, the method may include receiving sets of musical segments which possess musical features as previously mentioned (tempo, rhythm, key, etc). Further, the method may include receiving at least one external musical input, either by audible proximity via a microphone input or via network connection [the "musical input" may also be silence]. Further, the method may include accessing a common clock source, via GPS chip, network connection, or accurately synchronized device clock. Further, the method may include receiving rules regarding which segments to play, when to play, rules for how to create musically-appropriate matches with the at least one external musical input. Further, the method may include applying the rules to choose a segment to play, using UMS to schedule the output audio such that its beats align with other automated units using the Jambot technology. Further, the method may include sending its stored set of compatible musical segments available to external requestors.

Although the present disclosure has been explained in relation to its preferred embodiment, it is to be understood that many other possible modifications and variations can be made without departing from the spirit and scope of the disclosure.

The following is claimed:

1. A method for facilitating creating of music in real time by multiple users, the method comprising:
    receiving, using a communication device, one or more first music segment selections from a first user device associated with a first user, wherein the one or more first music segment selections identifies one or more first music segments;
    receiving, using the communication device, one or more second music segment selections from a second user device associated with a second user, wherein the one or more second music segment selections identifies one or more second music segments, wherein the one or more first music segments is musically compatible with the one or more second music segments;
    transmitting, using the communication device, the one or more first music segment selections to the second user device;
    transmitting, using the communication device, the one or more second music segment selections to the first user device, wherein each of the first user device and the second user device is configured for:
        retrieving, using a client-side storage device of each of the first user device and the second user device, the one or more first music segments;
        retrieving, using the client-side storage device of each of the first user device and the second user device, the one or more second music segments;
        synchronizing, using a client-side processing device each of the first user device and the second user device, the one or more second music segments with the one or more first music segments to a common musical beat based on a universal time; and
        generating, using a sound reproduction device of each of the first user device and the second user device, a mixed music comprising the one or more first music segments and the one or more second music segments, wherein the one or more first music segments is associated with one or more first spatial locations, wherein the one or more second music segments is associated with one or more second spatial locations. wherein the one or more first spatial locations corresponds to one or more locations of one or more first sound sources associated with the one or more first music segments. wherein the one or more second spatial locations corresponds to one or more locations of one or more second sound sources associated with the one or more second music segments, wherein the sound reproduction device in each of the first user device and the second user device is configured for reproducing the mixed music based on the one or more first spatial locations and the one or more second spatial locations.

2. The method of claim 1 further comprising transmitting, using the communication device, each of the one or more first music segments and the one or more second music segments to each of the first user device and the second user device.

3. The method of claim 1 further comprising:
    analyzing, using a processing device, a collection of music segments using machine learning, wherein each music segment is characterized by a musical feature; and
    identifying, using the processing device, the one or more first music segments and the one or more second music segments based on the analyzing.

4. The method of claim 3 further comprising extracting, using the processing device, each of the musical feature for each music segment using a feature detection algorithm based on machine learning.

5. The method of claim 1 further comprising:
    analyzing, using a processing device, a selected first music segment of the one or more first music segments;
    identifying, using the processing device, a recommended first music segment of the one or more first music segments based on the analyzing; and
    transmitting, using the communication device, a recommendation to the first user device based on the identifying, wherein the recommendation comprises indication of the recommended first music segment.

6. The method of claim 5 further comprising analyzing, using the processing device, the one or more second music segments, wherein the identifying of the recommended first music segment is further based on the analyzing of the one or more second music segments.

7. The method of claim 1, wherein each of the first user device and the second user device comprises a motion sensor configured to sense a movement associated with at least one of the first user and the second user, wherein the sound reproduction device is configured for reproducing the mixed music based on the movement.

8. The method of claim 1, wherein the first user device is further configured for:
receiving, using an input device, a preview mode selection, wherein the generating of the mixed music by the sound reproduction device of the first device is based on the receiving of the preview mode selection; and
receiving, using the input device, a join mode selection, wherein the method further comprises receiving, using the communication device, the join mode selection from the first user device, wherein the transmitting of the one or more first music segment selections to the second user device is based on the receiving of the join mode selection from the first user device.

9. The method of claim 1 further comprising:
receiving, using the communication device, two or more requests from two or more second user devices associated with two or more second users, wherein the two or more requests comprises two or more second user information associated with the two or more second users;
analyzing, using a processing device, the two or more second user information based on one or more criteria;
determining, using the processing device, a fulfillment of the one or more criteria by a second user of the two or more second users based on the analyzing of the two or more second user information;
identifying, using the processing device, the second user from the two or more second users based on the fulfillment;
generating, using the processing device, a notification based on the identifying; and
transmitting, using the communication device, the notification to the second user device.

10. A system for facilitating creating of music in real time by multiple users, the system comprising:
a communication device configured for:
receiving one or more first music segment selections from a first user device associated with a first user, wherein the one or more first music segment selections identifies one or more first music segments;
receiving one or more second music segment selections from a second user device associated with a second user, wherein the one or more second music segment selections identifies one or more second music segments, wherein the one or more first music segments is musically compatible with the one or more second music segments;
transmitting the one or more first music segment selections to the second user device; and
transmitting the one or more second music segment selections to the first user device, wherein each of the first user device and the second user device comprises a client-side storage device, a client-side processing device, and a sound reproduction device, wherein is the client-side storage device of each of the first user device and the second user device is configured for:
retrieving the one or more first music segments; and
retrieving the one or more second music segments, wherein the client-side processing device of each of the first user device and the second user device is configured for
synchronizing the one or more second music segments with the one or more first music segments to a common musical beat based on a universal time wherein the sound reproduction device of each of the first user device and the second user device is configured for generating a mixed music comprising the one or more first music segments and the one or more second music segments, wherein the one or more first music segments is associated with one or more first spatial locations, wherein the one or more second music segments is associated with one or more second spatial locations. wherein the one or more first spatial locations corresponds to one or more locations of one or more first sound sources associated with the one or more first music segments. wherein the one or more second spatial locations corresponds to one or more locations of one or more second sound sources associated with the one or more second music segments. wherein the sound reproduction device in each of the first user device and the second user device is configured for reproducing the mixed music based on the one or more first spatial locations and the one or more second spatial locations.

11. The system of claim 10, wherein the communication device is further configured for transmitting each of the one or more first music segments and the one or more second music segments to each of the first user device and the second user device.

12. The system of claim 10 further comprising a processing device communicatively coupled with the communication device, wherein the processing device is configured for:
analyzing a collection of music segments using machine learning, wherein each music segment is characterized by a musical feature; and
identifying the one or more first music segments and the one or more second music segments based on the analyzing.

13. The system of claim 12, wherein the processing device is further configured for extracting each of the musical feature for each music segment using a feature detection algorithm based on machine learning.

14. The system of claim 10 further comprising a processing device communicatively coupled with the communication device, wherein the processing device is configured for:
analyzing a selected first music segment of the one or more first music segments; and
identifying a recommended first music segment of the one or more first music segments based on the analyzing, wherein the communication device is further configured for transmitting a recommendation to the first user device based on the identifying, wherein the recommendation comprises indication of the recommended first music segment.

15. The system of claim 14, wherein the processing device is further configured for analyzing the one or more second music segments, wherein the identifying of the recommended first music segment is further based on the analyzing of the one or more second music segments.

16. The system of claim 10, wherein each of the first user device and the second user device comprises a motion sensor configured to sense a movement associated with at least one of the first user and the second user, wherein the sound reproduction device is configured for reproducing the mixed music based on the movement.

17. The system of claim 10, wherein the first user device comprises an input device, wherein the input device of the first user device is configured for:
receiving a preview mode selection, wherein the generating of the mixed music by the sound reproduction device of the first device is based on the receiving of the preview mode selection; and
receiving a join mode selection, wherein the communication device is further configured for receiving the join mode selection from the first user device, wherein the transmitting of the one or more first music segment selections to the second user device is based on the receiving of the join mode selection from the first user device.

18. The system of claim 10, wherein the communication device is further configured for:

receiving two or more requests from two or more second user devices associated with two or more second users, wherein the two or more requests comprises two or more second user information associated with the two or more second users; and transmitting a notification to the second user device, wherein the system further comprises a processing device communicatively coupled with the communication device, wherein the processing device is configured for:

analyzing the two or more second user information based on one or more criteria;

determining a fulfillment of the one or more criteria by a second user of the two or more second users based on the analyzing of the two or more second user information;

identifying the second user from the two or more second users based on the fulfillment; and generating the notification based on the identifying.

* * * * *